United States Patent
Seman, Jr. et al.

(10) Patent No.: US 11,451,185 B2
(45) Date of Patent: Sep. 20, 2022

(54) BATTERY PACK, POWER TOOL AND BATTERY PACK CHARGER SYSTEM

(71) Applicant: Black & Decker Inc., New Britain, CT (US)

(72) Inventors: Andrew E. Seman, Jr., Pylesville, MD (US); Matthew J. Velderman, Baltimore, MD (US); Daniel J. White, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 143 days.

(21) Appl. No.: 16/376,810

(22) Filed: Apr. 5, 2019

(65) Prior Publication Data

US 2019/0237715 A1 Aug. 1, 2019

Related U.S. Application Data

(63) Continuation of application No. PCT/US2017/055619, filed on Oct. 3, 2017.

(Continued)

(51) Int. Cl.
| | | |
|---|---|---|
| *H01M 10/00* | (2006.01) |
| *H02P 29/40* | (2016.01) |
| *B60L 3/08* | (2006.01) |
| *B60L 3/06* | (2006.01) |
| *H01M 16/00* | (2006.01) |
| *H02J 7/34* | (2006.01) |
| *H01M 8/04858* | (2016.01) |
| *H01M 50/20* | (2021.01) |
| *H01M 50/543* | (2021.01) |
| *C07F 5/02* | (2006.01) |
| *H01M 10/0567* | (2010.01) |
| *H01M 10/0568* | (2010.01) |
| *B60L 1/00* | (2006.01) |

(52) U.S. Cl.
CPC .............. *H02P 29/40* (2016.02); *B60L 3/06* (2013.01); *B60L 3/08* (2013.01); *C07F 5/022* (2013.01); *H01M 8/04947* (2013.01); *H01M 10/0567* (2013.01); *H01M 10/0568* (2013.01); *H01M 16/006* (2013.01); *H01M 50/20* (2021.01); *H01M 50/543* (2021.01); *H02J 7/34* (2013.01); *B60L 1/003* (2013.01); *B60Y 2400/60* (2013.01); *H01M 2220/30* (2013.01)

(58) Field of Classification Search
CPC ......... H01M 10/425; H01M 2010/4271; H02J 7/34; Y02E 60/10
See application file for complete search history.

(56) References Cited

U.S. PATENT DOCUMENTS

2015/0207431 A1* 7/2015 Brotto ............... H02J 3/00 363/131
2018/0166910 A1* 6/2018 Sun .................. H02J 7/345

* cited by examiner

*Primary Examiner* — Cynthia H Kelly
*Assistant Examiner* — Monique M Wills
(74) *Attorney, Agent, or Firm* — Michael Aronoff

(57) ABSTRACT

When providing alternating current (AC) power to operate AC powered devices such as power tools (such as drills, table saws, miter saws), equipment (such as lawn mowers), and consumer products (such as refrigerators, television, lights) without being tied to a fixed utility power supply typically requires a generator (such as an internal combustion engine based generator) or a battery powered inverter. In order to meet power and runtime needs for these devices, a battery powered inverter must be relatively large and expensive. This simple fact prohibits their use in many environments.

6 Claims, 39 Drawing Sheets

Related U.S. Application Data

(60) Provisional application No. 62/404,999, filed on Oct. 6, 2016, provisional application No. 62/405,118, filed on Oct. 6, 2016.

BATTERY PACK, POWER TOOL AND BATTERY PACK CHARGER SYSTEM

CROSS-REFERENCE TO RELATED APPLICATION

This application is a continuation of PCT Application No. PCT/US2017/055619, filed Oct. 6, 2017, entitled "BATTERY PACK, POWER TOOL AND BATTERY PACK CHARGER SYSTEM," which claims priority to PCT Application No. PCT/US2017/054857, filed Oct. 3, 2017, entitled "BATTERY AND MOTOR SYSTEM FOR REPLACING INTERNAL COMBUSTION ENGINE," together with U.S. Provisional Application No. 62/404,999, filed on Oct. 6, 2016, entitled, "BATTERY PACK, POWER TOOL AND BATTERY PACK CHARGER SYSTEM" and U.S. Provisional Application No. 62/405,118, filed on Oct. 6, 2016, entitled, "BATTERY AND MOTOR SYSTEM FOR REPLACING INTERNAL COMBUSTION ENGINE."

TECHNICAL FIELD

This application relates to a system including a battery pack, a direct current (DC) power tool and a battery pack charger and a method of operating the battery pack, power tool and battery pack charger. In one implementation, the battery pack includes a high voltage battery bank, a DC output port and an alternating current (AC) output port, a switching network for generating an AC waveform from the battery bank and configured to simultaneously provide an AC output waveform at the AC output port and a DC output waveform at the DC output port.

BACKGROUND

When providing alternating current (AC) power to operate AC powered devices such as power tools (such as drills, table saws, miter saws), equipment (such as lawn mowers), and consumer products (such as refrigerators, television, lights) without being tied to a fixed utility power supply typically requires a generator (such as an internal combustion engine based generator) or a battery powered inverter. In order to meet power and runtime needs for these devices, a battery powered inverter must be relatively large and expensive. This simple fact prohibits their use in many environments.

Referring to FIG. 1, common AC voltage in the US and elsewhere globally is approximately 120 volts AC. This value is a root-mean squared (RMS) value that will provide an equal value to that of a direct current (DC) power source powering a resistive load. The peaks of the 120V AC sine wave are a 170V.

There are common methods for producing a waveform to run an AC product, including a pure sine wave, a square wave, and a modified sine wave.

An inverter that produces a pure sine wave will attempt replicate the AC waveform produced by a utility power supply. It will likely run any product without issue. However, it requires expensive and large electronic components (i.e. inductors, transformers) to provide such a clean, consistent waveform.

An inverter that produces a square wave will match the RMS of the 120V AC utility power supply but the shape of the waveform may cause issues with some AC products, such as products with particularly sensitive electronics, electronic drives, audio, and induction motors. This inverter uses inexpensive and small electronics relative to the pure sine wave inverter.

An inverter that produces a modified sine wave will match the RMS of the 120V AC utility power supply and is generally able to run a wider range of AC products, but may have issue operating products with variable speed control and electronics that require a 'zero-cross' at line frequency (i.e. '60 Hz'). This inverter also uses inexpensive and small electronics relative to the pure sine wave inverter.

Typical battery based inverters use low voltage batteries or a bank of battery cells or packs, such as a 12V DC battery pack or a plurality of cells strung together to produce 12V DC as compared to the 120V AC of a utility power supply. With reference to FIG. 2, to increase the battery voltage level to a level necessary to achieve the necessary higher AC voltage waveform, these inverters require a DC to DC converter (also known as a boost converter) between the battery and the inverter circuit. The converter electronics are also large, expensive, and add heat to the system. One system which utilizes a high voltage battery bank to achieve the necessary DC voltage level without a boost converter is disclosed in U.S. Pat. No. 8,994,336. This system then inverts the high voltage DC waveform to a high voltage AC waveform for use by AC powered devices.

Thermal management of the boost converter and/or the inverter circuitry typically requires a significant increase in the physical size of the inverter.

As such, conventional systems have either required a boost converter in conjunction with a low voltage battery to produce a high voltage DC signal and an inverter of some type to produce the high voltage AC signal to power AC powered devices or a high voltage battery bank and an inverter of some type to produce the high voltage AC signal to power AC powered devices.

Typical inverters, whether using a low voltage DC battery and a boost converter or a high voltage battery bank operate using the full DC voltage of all of the available battery cells to provide the positive half of the AC cycle and then electrically invert the same full DC voltage of all of the available battery cells to provide the negative half of the AC cycle.

U.S. Patent Application Publication No. 2015/0003135 discloses a direct current to alternating current converter circuit that utilizes a first DC power supply and a second DC power supply, a pair of electronic switches and a pair of output terminals to produce a square wave waveform. This circuit does not disclose many of the novel features described in the present disclosure.

If a person comes into contact with high voltage (approximately 60 volts or greater) it can cause serious injury or worse. A high voltage battery pack may be designed such that all high voltage points—including the output terminals—are made inaccessible according to safety standards. However, a device that is capable of receiving two or more of the high voltage battery packs (connected in parallel) necessarily includes an equal number of battery pack receptacles and associated terminal blocks. In this scenario, the high voltage of the high voltage battery pack may be accessible through an empty battery pack receptacle if the terminals of the device terminal block are exposed. Methods for preventing access to this high voltage—e.g. transistors, relays, opto-isolators—are large and costly and as such impractical for implementation in a high power battery pack and tool system.

If a battery pack or portable power supply were to include two discrete subset of battery cells, it would be advantageous to be able to charge the discrete subsets of battery cells individually or simultaneously using a single battery pack charger. If power is drawn from each subset of battery cells unevenly or if impedance differences between the subsets of battery cells cause power to be drawn unevenly when power is being drawn from both subsets of battery cells or if current drains from the electronics related to one subset of battery cells is greater than the other subset of battery cells it is likely that a voltage imbalance will develop between the two subsets of battery cells. It is desirable to correct this voltage imbalance during charging. It is also desirable to keep the charging DC voltage as low as possible to reduce the size and cost of the charger.

SUMMARY

An aspect of the present invention includes a battery pack having a set of battery cells. The set of battery cells is configured into two subsets of battery cells with a pack control module configured such that a first subset of battery cells provides a positive signal (waveform) at an AC output port and a second subset of battery cells provides a negative signal (waveform) at the AC output port. The first and second subsets of cells are coupled to the AC output port sequentially to provide an AC power waveform at the AC output port.

Another aspect of the present invention further comprises providing a battery pack that outputs an AC power waveform and a DC power waveform simultaneously from a single set of battery cells.

Another aspect of the present invention further comprises including a DC-DC converter for each subset of battery cells to produce a zero cross as part of the AC power waveform. This is achieved by producing a relatively low step voltage by each DC-DC converter from the battery voltage.

In other embodiments the battery bank may provide the lower step voltage and the DC-DC converter provide a peak voltage. Alternatively, there may be a first set of battery cells to provide the lower step and a second set of battery cells to provide the peak voltage.

Another aspect of the present invention includes a terminal system that prevents a user from accessing high voltage in a device that uses multiple high voltage battery packs. The device includes a plurality of battery pack receptacles, each battery pack receptacle configured to receive a high voltage battery pack. The terminal system includes a plurality of terminals in the battery pack and a corresponding plurality of terminals in the device. A mechanical arrangement and shrouding of certain of the terminals of the terminal system prevents access to high voltage when only one of the battery receptacles is occupied by a high voltage battery pack. The terminals may include a female tulip and male blade design. The female tulip terminals may be recessed or shrouded to prevent accessibility and the male terminals are projected from the device housing and exposed. The device male blade power terminal that couples to the battery female tulip power terminal is connected within the device to a first device female tulip terminal that is recessed within the device housing or shrouded by the device housing. The first device female tulip terminal is electrically isolated from all other components in the device power circuit. The first device female tulip terminal couples with a first battery pack male blade jumper terminal which in turn is coupled to a second battery pack male blade jumper terminal which in turn is coupled to a second device female tulip terminal which is recessed within the device housing or shrouded by the device housing. The second device female tulip terminal is coupled to a positive node of the load. The first and second battery pack male blade jumper terminals are not connected to any potential of the battery and are solely for mating the first and second device female tulip terminals. A similar arrangement may be present for the negative battery pack-device connections, however, depending upon the accessibility of other system potentials, only one arrangement may be needed.

Another aspect of the present invention is a charger configured to selectively charge subsets of battery cells within the battery pack. Advantages of this implementation are to correct imbalances between the subsets of battery cells, use a lower charge voltage for a more cost effective and smaller power supply(s), and to allow for one power supply to selectively charge both subsets of battery cells.

A charge current is selectively delivered to the subsets of battery cells: to a first subset of battery cells or to a second subset of battery cells or to both subsets of battery cells. In addition there may be a balancing charge to one of the subsets of battery cells or to individual cells within a particular subset of battery cells. The charging of the subsets of battery cells may be controlled by the battery pack control module or by the charger control module or by both the battery pack control module and the charger control module. The switches for selecting which subset of battery cells is charged may be mechanical (i.e. relays) or electrical (i.e. transistors) switches.

Implementations of this aspect may include one or more of the following features.

DETAILED DESCRIPTION

Figure 1:
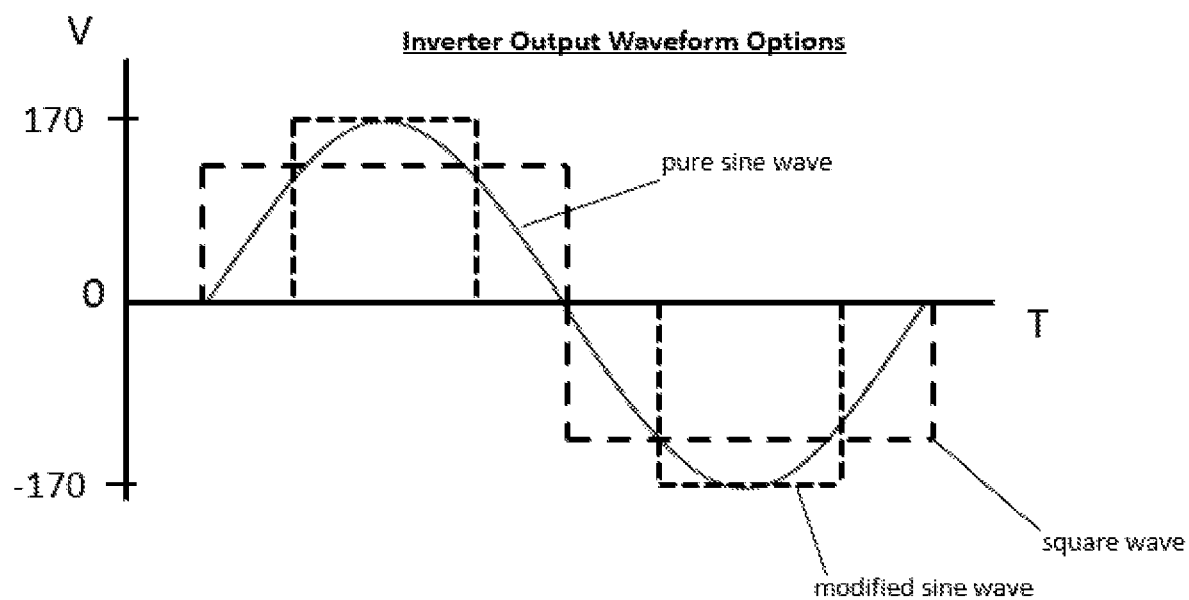
FIG. 1 is a graph of waveforms output by various inverters.
Figure 2:
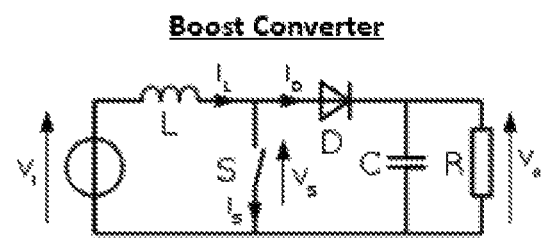
FIG. 2 is an exemplary circuit diagram of a boost converter.
Figure 3:
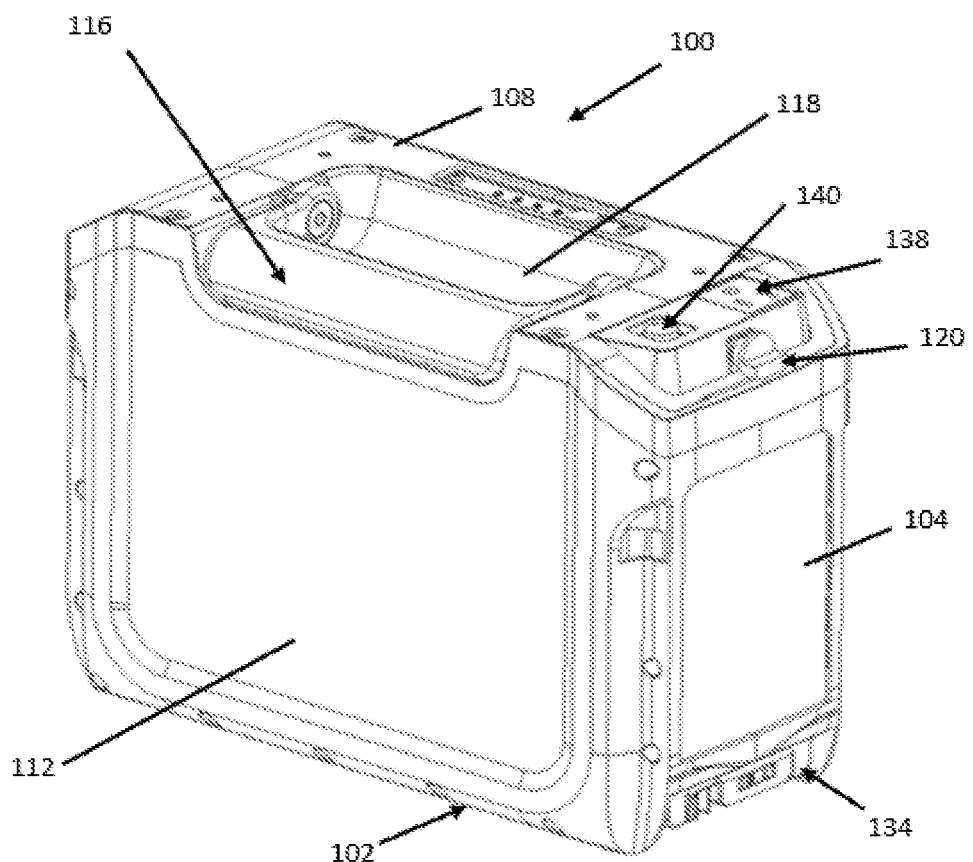
FIG. 3 is a perspective view of an exemplary embodiment of a battery pack of the present invention.
Figure 4:
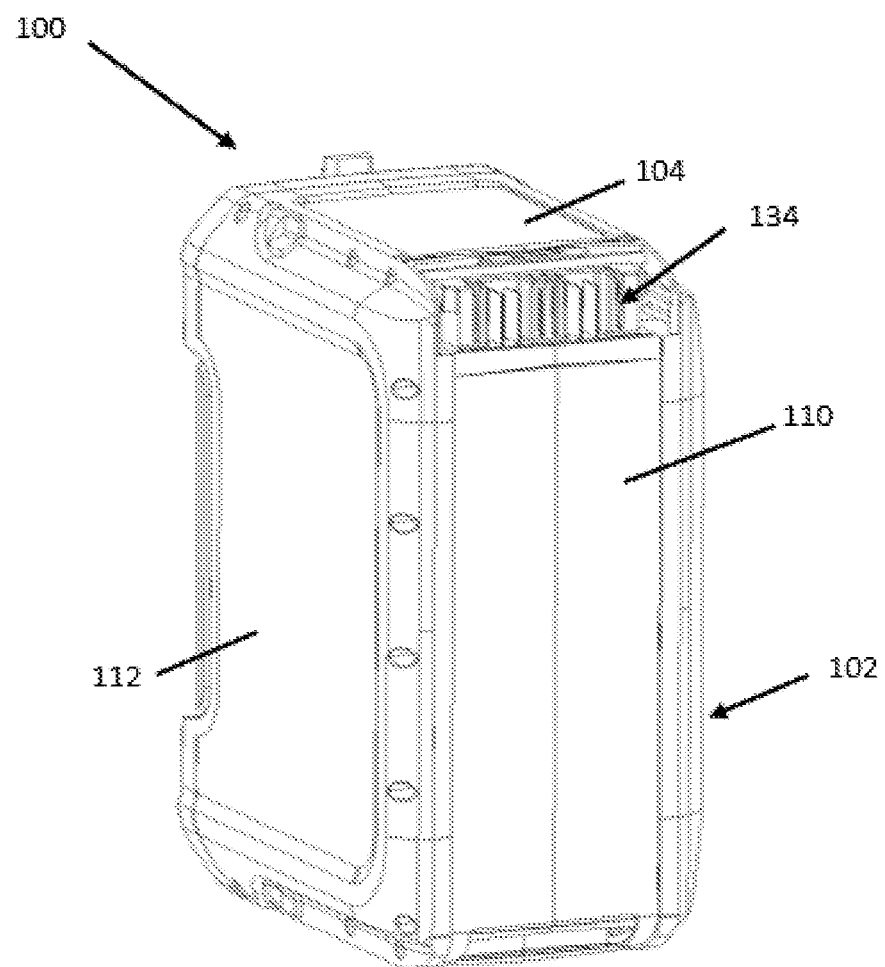
FIG. 4 is another perspective view of the battery pack of FIG. 3.
Figure 5:
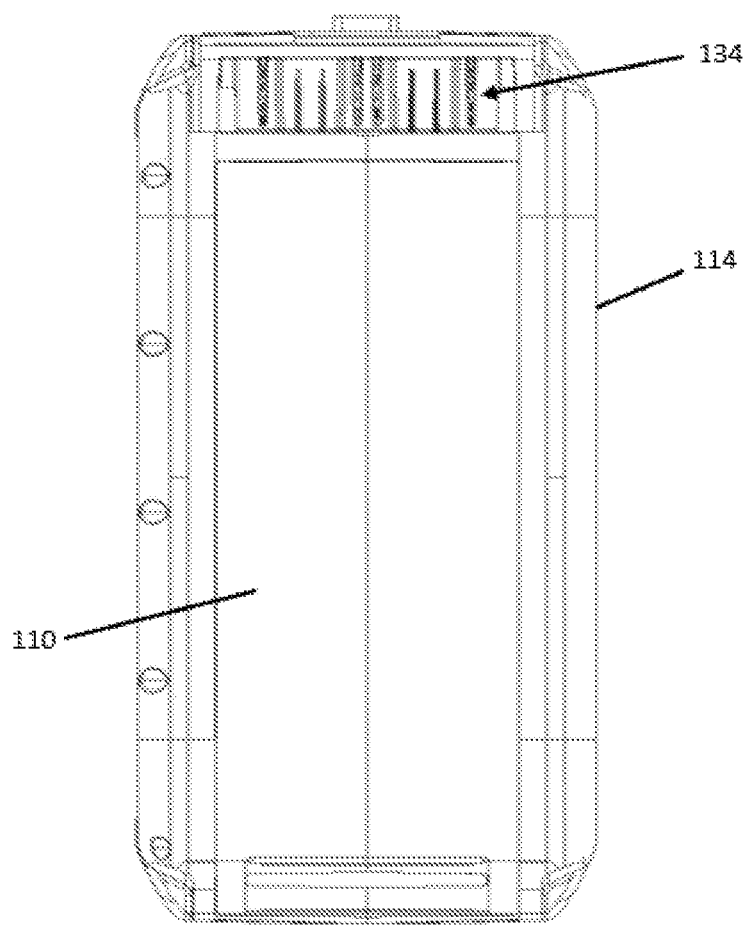
FIG. 5 is a bottom view of the battery pack of FIG. 3.
Figure 6:
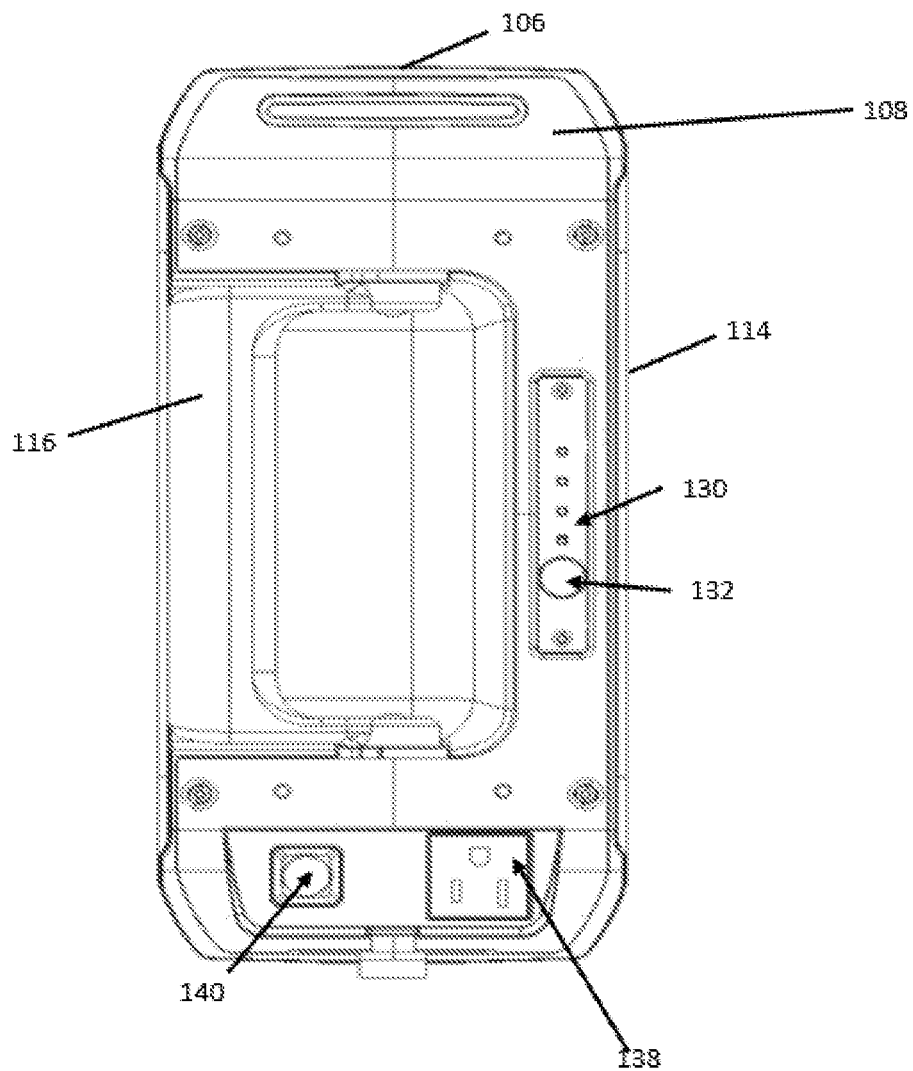
FIG. 6 is a top view of the battery pack of FIG. 3.
Figure 7:
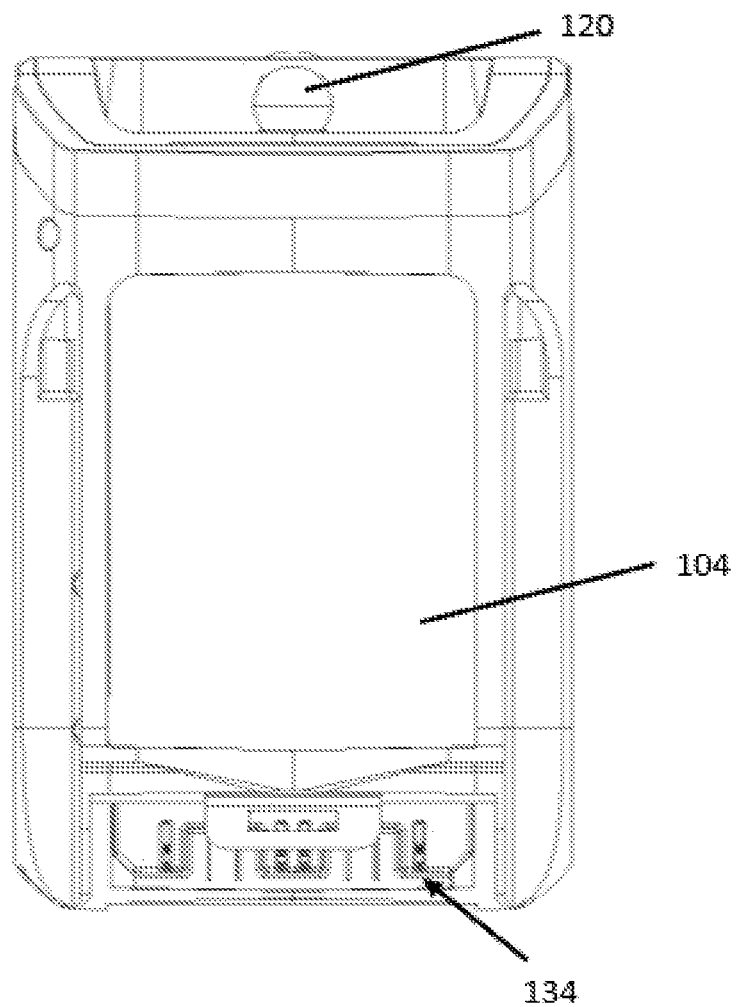
FIG. 7 is a front view of the battery pack of FIG. 3.
Figure 8:
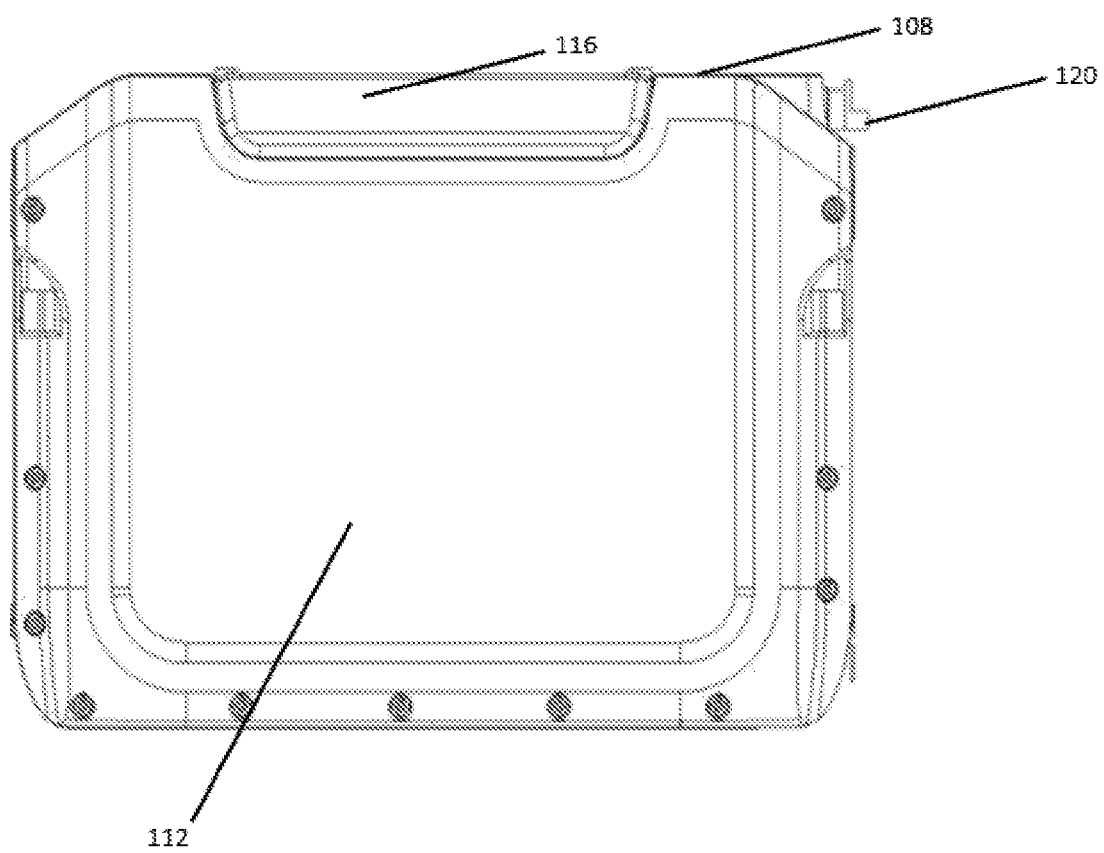
FIG. 8 is a side view of the battery pack of FIG. 3.

Referring to FIGS. 3-8, there is disclosed an exemplary embodiment of a battery pack 100 of the present disclosure. The battery pack 100 may also sometimes be referred to as a portable power supply. The battery pack 100 comprises a generally rectangular box housing 102. The housing 102 includes a front side 104, a rear side 106, top side 108, a bottom side 110, a left side 112 and a right side 114. The housing 102 also includes a handle 116 on the top side 108.

Figure 43:
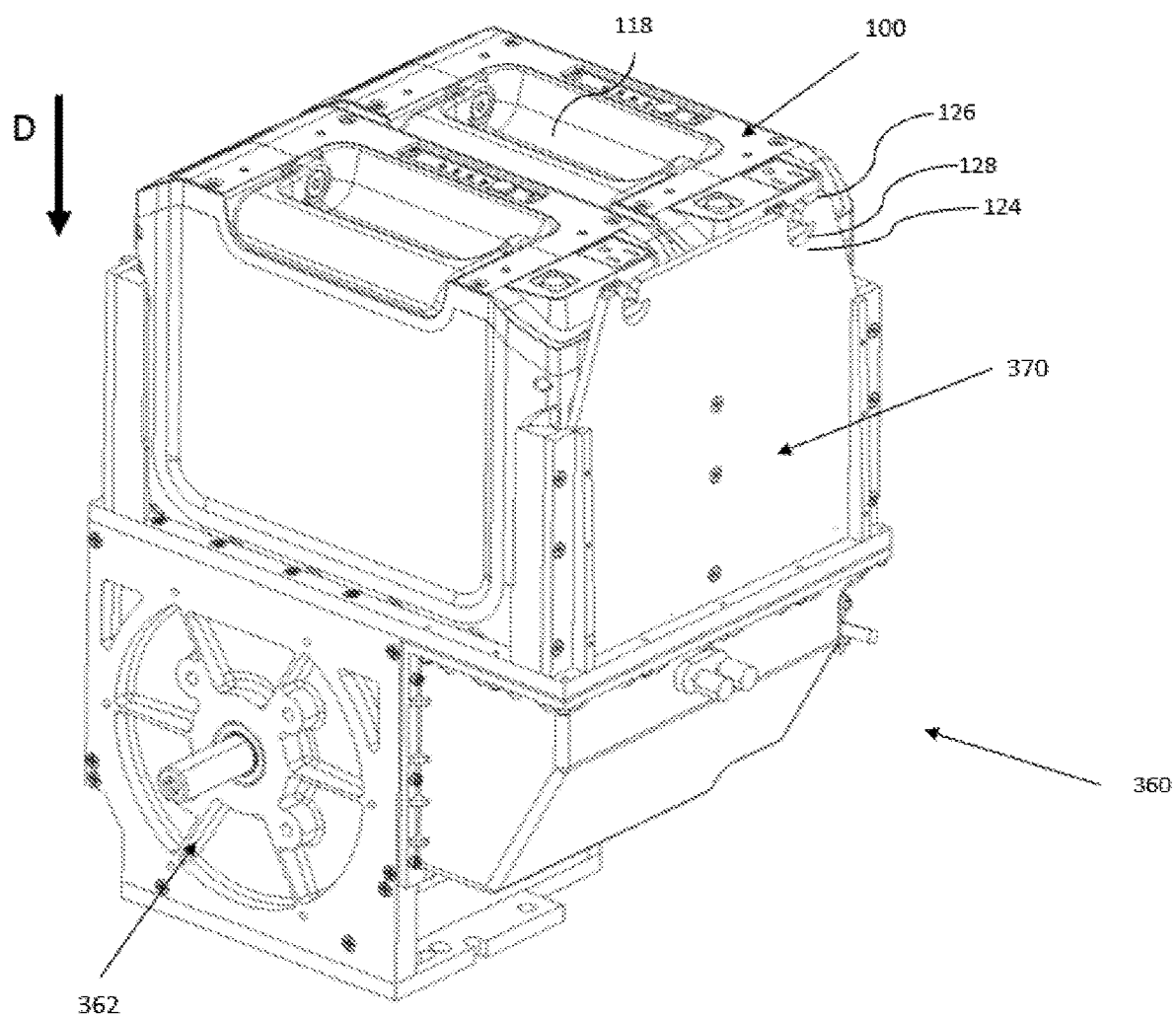
FIG. 43 illustrates two of the battery packs of FIG. 3 coupled to an electric motor.

Also referring to FIG. 43, the handle 116 is illustrated in a received position in which the handle 116 rests in a cutout 118 in the top side 108 of the housing. The handle 116 may rotate out of the cutout 118 (in a clockwise direction from the perspective of FIG. 7). The handle 116 may also include a locking element 120 extending from the front side 104 of the housing 102. The locking element 120 may include a semi-cylindrical portion 122. As the handle 116 rotates the locking element 120 rotates. As shown in FIG. 3-8, the handle 116 and the locking element 120 are in a locking position. As the handle 116 rotates up and out of the cutout 118 to an "up" position, the locking element 120 also rotates. An exemplary device 500 to which two battery packs 100 are coupled may include a receiving J-slot 124. Prior to placing the battery pack 100 into the device 500 the handle 116 is rotated to the up position and semi-cylindrical portion 122 of the locking element 120 is rotated to a vertical position. As the battery pack 100 mates with the device 360 the semi-cylindrical portion 122 of the locking element 120 is received in a vertical portion 126 of the device J-slot 124. Once the battery pack 100 is fully seated in the device 360 the handle 116 is rotated back into the cutout 118. As the handle 116 rotates back to its down position, the semi-cylindrical portion 122 of the locking element 120 also rotates to the locking position within the J-slot 124. Once in the locking position, the semi-cylindrical portion 122 of the locking element 120 is in a horizontal position and abuts against a horizontal portion 128 of the device J-slot 124. This locks the battery pack 100 into the device battery pack receiving chamber 370.

The housing 102 may also include a state of charge (SOC) indicator 130 on the top side 108 and a switch 132 for activating the SOC indicator 130. The SOC indicator 130 displays the state of charge of a plurality of battery cells 146 within the battery pack when the switch is activated.

The housing 102 also includes a direct current (DC) port 134—also referred to as a tool receptacle, a battery pack port, or an interface. The DC port 134 provides an interface for coupling the battery pack 100 to DC powered devices 160 such as power tools, lights, lawn mowers, go carts, or snow mobiles. The DC port 134 includes a plurality of electrical terminals 136—also referred to as a set of electrical terminals. The set of electrical terminals 136 may include a subset of power terminals 136A and a subset of signal terminals 136B. The power terminals 136A transfer current and voltage at levels adequate power a load 162 of a coupled device 160 such as an electric motor of a power tool or lawn mower or receive current and voltage at a level from a battery pack charger to charge the battery cells 146. The signal terminals 136B transfer current and voltage at a level adequate to provide information or data from the battery pack 100 to a coupled device 160 regarding the state of the battery pack 102 and/or battery cells 146 or to receive information or data from a coupled device 160 regarding the state of the device 160. Typically, the current and voltage levels transferred on the power terminals 136A are greater than the current and voltage levels transferred on the signal terminals 136B.

The plurality of battery pack terminals 136 may comprise solely male terminals, or solely female terminals or a combination of male and female terminals with a corresponding configuration in the coupled device 160. Furthermore, the plurality of battery pack terminals 136 may be configured such that they all are recessed in the housing 102, all extend from the housing 102 or some are recessed in the housing 102 and some extend from the housing 102. The electrical terminals 136 will be discussed in greater detail below.

The housing 102 also includes an alternating current (AC) port 138—also referred to as a plug receptacle, an interface. The AC port 138 provides an interface for coupling the battery pack 100 to AC powered devices such as power tools, lights, or appliances. As illustrated, the AC port 138 is a standard three-prong receptacle but it may take other configurations.

The housing 102 may also include a switch or button 140 for activating an inverter 142 for providing an AC power output waveform 150 at the AC port 138. The switch 140 may be coupled to the internal inverter or a simpler circuit 142 for providing the AC power output waveform 150 from the set of battery cells 146. This will be discussed in more detail below.

Figure 9:
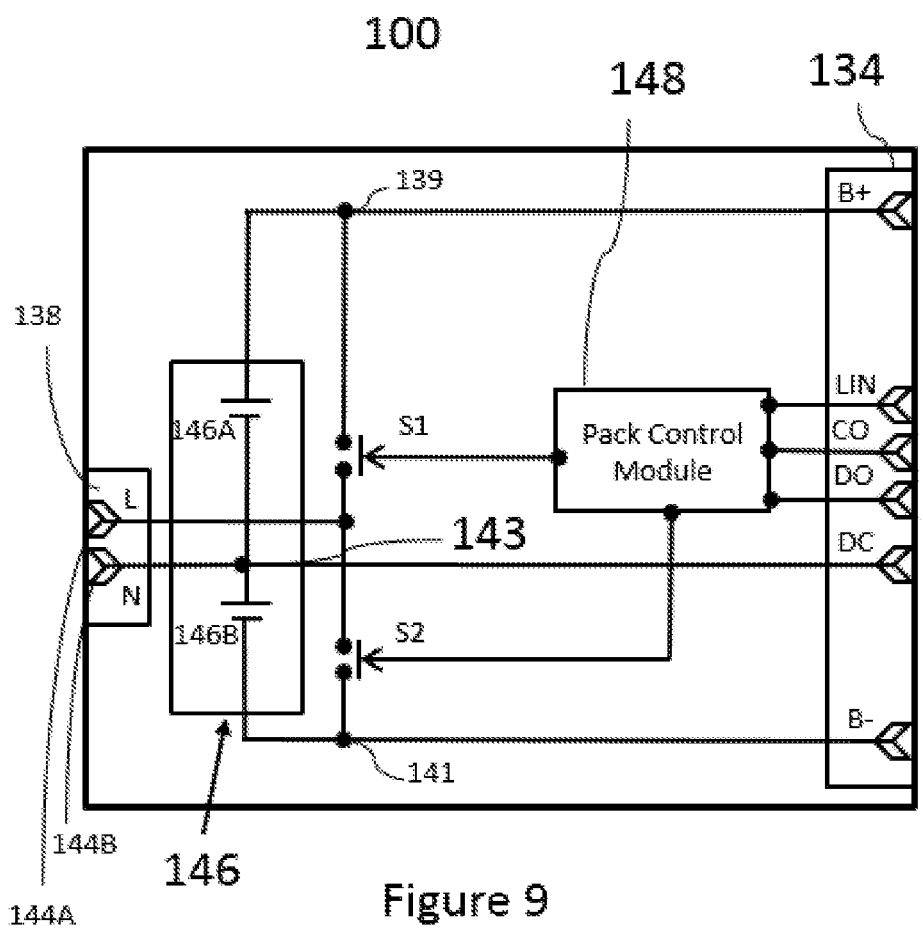
FIG. 9 illustrates an exemplary circuit diagram of the battery pack of FIG. 3 capable of providing an AC output waveform and a DC output waveform from a single battery bank.

Referring to FIG. 9, an exemplary battery pack circuit diagram for the exemplary battery pack 100 described above with reference to FIGS. 3-8 is disclosed. The battery pack 102 includes a DC port 134 and an AC port 138. The DC port 134 includes a plurality of terminals 136—also referred to as a set of terminals 136 and referred to herein as the DC terminals 136. The set of DC terminals 136 includes a subset of power terminals B+, B− (136A1, 136A2) and a subset of signal terminals LIN, CO, DO, DC (136C1, 136C2, 136C3, 136C4). As illustrated in this configuration, the set of DC terminals 136 is configured as female terminals (noted by the lack of fill in the arrow) and as recessed in the battery pack housing 102 (noted by the arrow positioned completely inside the line representing the battery pack housing). The AC port 138 also includes a plurality of terminals 144—also referred to as a set of terminals 144 and referred to herein as the AC terminals 144. The set of AC terminals 144 includes a line terminal L 144A and a neutral terminal N 144B and may also include a ground terminal G 144C (not illustrated in FIG. 9).

The battery pack 102 also includes a plurality of battery cells 146—also referred to as a battery bank 146 or a set of battery cells 146. In the illustrated circuit, the battery bank 146 (or set of cells) includes a first sub-bank (or subset) of cells 146A and a second sub-bank (or subset) of cells 146B. Each subset of cells 146A, 146B may include one or more battery cells. Generally speaking, each subset includes the same number of cells but that is not necessarily the case. In this embodiment, each subset of battery cells 146A, 146B includes 45 Li-Ion cells. Each cell has a nominal voltage of 3.7-3.8 volts. As such, each subset of cells 146A, 146B has a nominal voltage of approximately 170 volts and the full set of cells (or the full battery bank) 146 has a nominal voltage of approximately 340 volts. As each subset of cells 146A, 146B has a nominal voltage of approximately 170 volts DC each subset of cells 146A, 146B is able to provide voltage equivalent to a utility power supply AC waveform.

The battery pack 102 also includes a pack control module 148. The pack control module 148 may include a microprocessor, a microcontroller, an application specific integrated circuit and/or various other electronic control devices. The battery pack 100 also includes a pair of switches S1, S2. The switches S1, S2 may be in the form of simple electromechanical switches, relays or transistors. The switches S1, S2 are electrically coupled to the pack control module 148 and controlled by the pack control module 148.

As will be discussed in more detail below, both the AC terminals L, N (144A, 144B) and the DC power terminals B+, B− (136A1,136A2) are coupled to the battery bank 146 enabling the battery pack 102 to supply both AC power and DC power from a single battery bank 146.

Figure 10:
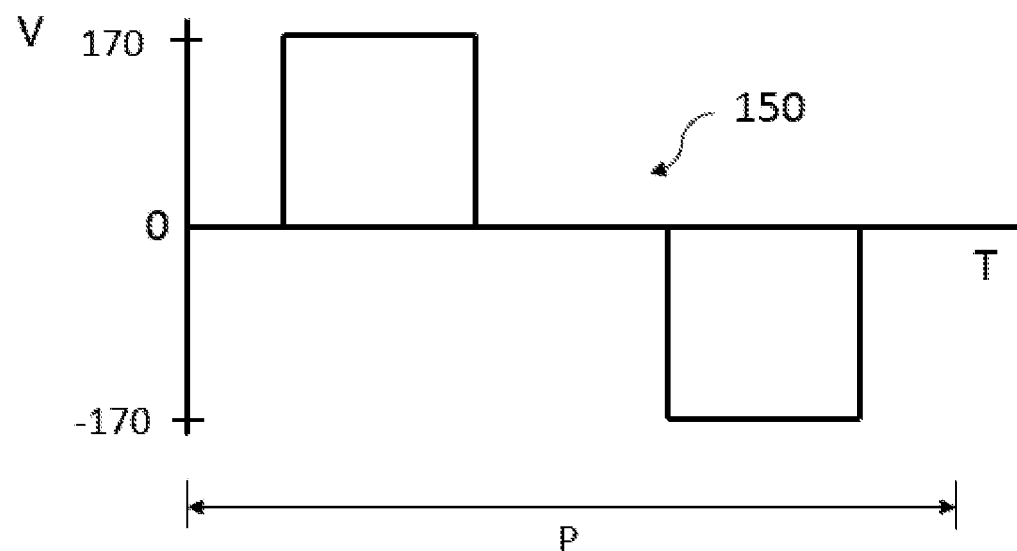
FIG. 10 illustrates an AC waveform output from the battery pack of FIG. 9.

With regard to providing an AC power output waveform 150 from the battery bank 146, when the battery pack 100 is coupled to an AC device and/or an inverter switch 140 on the housing 102 is activated, the pack control module 148 begins controlling the switches S1, S2. As illustrated in FIGS. 9 and 10, the first switch S1 is coupled between a positive side (or node) 139 of the first subset of battery cells 146A and the AC line terminal L 144A and the second switch S2 is coupled between the AC line terminal L 144A and a negative side (or node) 141 of the second subset of battery cells 146B. The AC neutral terminal N 144B is coupled to a node 143 at the negative terminal of the first subset of battery cells 11416A and the positive terminal of the second subset of battery cells 146B. Both of the switches S1, S2 are coupled to the pack control module 148. Based on a timing pattern of opening and closing the switches S1, S2 under control of the pack control module 148, the battery pack 100 is able to provide an AC power output waveform 150 in the form of a modified sine wave at the AC port 138. As an example, when both switches S1, S2 are open (during the first ⅛ of the period P) there is no voltage at the AC output. (As one of ordinary skill would understand, dividing the period P into fixed, equal parts, namely eighths, is only provided as an exemplary manner to implement the process. The period P could be divided into dynamic parts that change in duration to maintain a suitable AC RMS voltage on the AC output waveform 150, depending on the battery voltage.) When the first switch S1 is closed and the second switch S2 is open (during the second and third ⅛ of the period P) there is a constant positive voltage at the AC output port 138 equal to the voltage of the first subset of battery cells 146A. When the first and second switches S1, S2 are open (during the fourth and fifth ⅛ of the period P) there is no voltage at the AC output port 138. When the first switch S1 is open and the second switch S2 is closed (during the sixth and seventh ⅛ of the period P) there is a constant negative voltage at the AC output port 138 equal to the voltage of the second subset of battery cells 146B. And finally, when the first and second switches S1, S2 are open (during the eighth ⅛ of the period P) there is no voltage at the AC output port 138.

In the two subsets of battery cells configuration, the subsets of battery cells 146A, 146B are simply switched in and out of the power supply circuit. The switching may be accomplished using simple electrical (e.g. transistor) or mechanical (e.g. relay) switches. The principal advantage utilizing two subsets of battery cells is that the complex electronics required for inversion are omitted thereby reducing heat, cost, and complexity.

In addition to the battery pack 100 providing an AC power output waveform 150 from the battery bank 146 the battery pack 100 may provide a DC power output waveform 152 from the same battery bank 146. More particularly, the battery pack DC power terminals B+, B− 146A1, 146A2 are coupled to the positive node 139 and the negative node 141 of the battery bank 146, respectively. In this manner, the battery pack 102 is capable of providing an AC power output waveform 150 equivalent to a utility power supply waveform at the AC port 138 while simultaneously providing a DC power output waveform 152 at the DC port 134. More particularly, the DC power output waveform 152 may be a high voltage power supply on the order of 340 volts.

Figure 11:
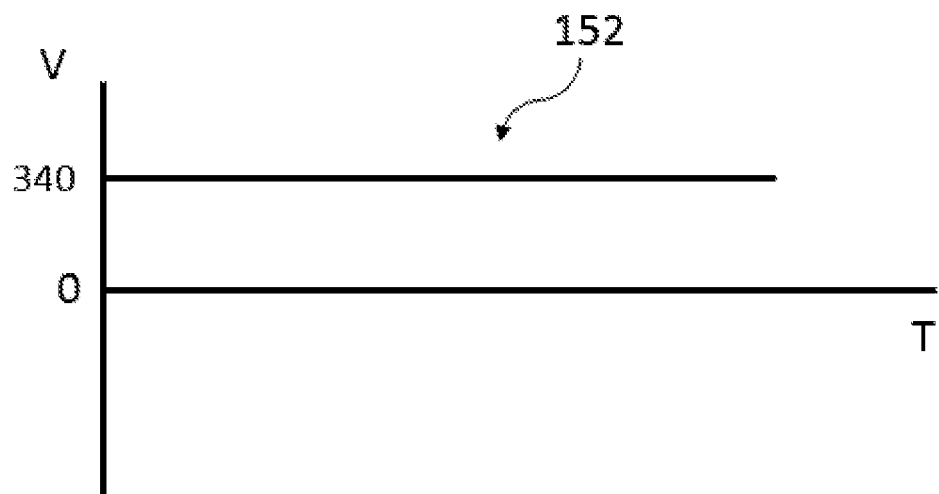
FIG. 11 illustrates a DC waveform output from the battery pack of FIG. 9.
Figure 12:
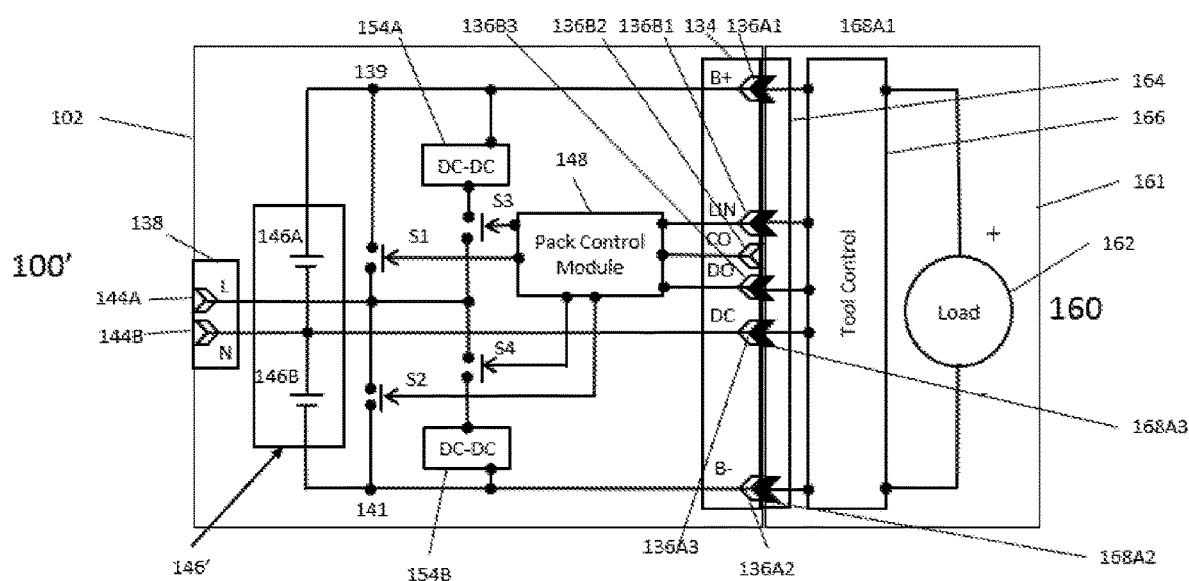
FIG. 12 illustrates another exemplary circuit diagram of the battery pack of FIG. 3 capable of providing an AC output waveform and a DC output waveform from a single battery bank and an exemplary DC power tool circuit diagram that may receive the DC power waveform from the battery pack.
Figure 13:
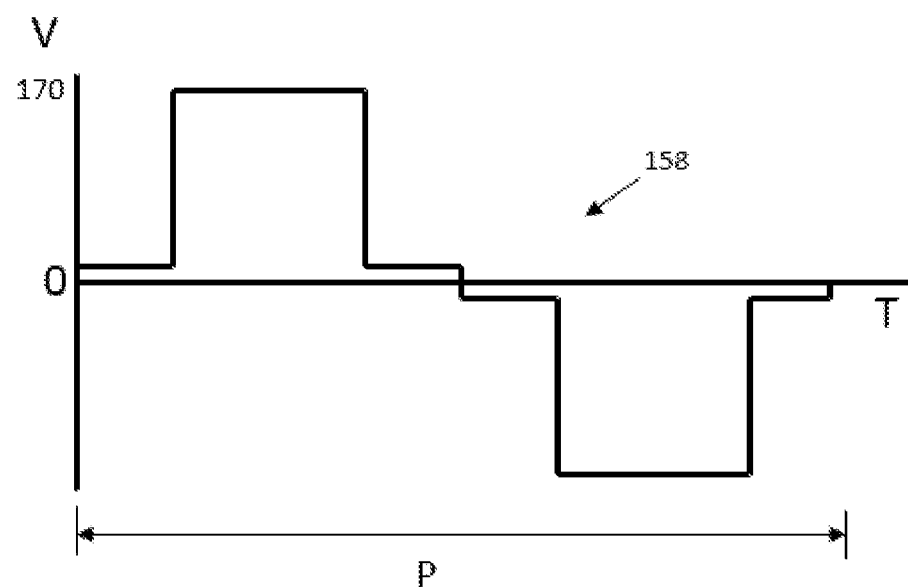
FIG. 13 illustrates an AC waveform output from the battery pack of FIG. 12.
Figure 14:
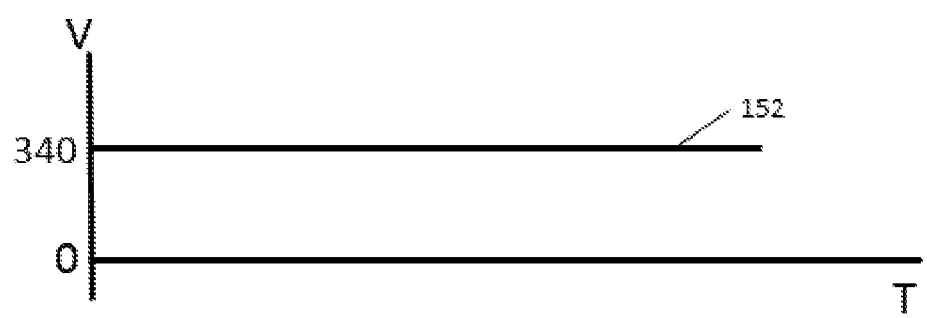
FIG. 14 illustrates a DC waveform output from the battery pack of FIG. 12.

Referring to FIGS. 12-14, there is illustrated another exemplary circuit diagram of a battery pack 100' of the present invention. In addition to the elements described above with respect to FIGS. 9-11, this battery pack 100' includes a first DC-DC converter 154A and an associated switch S3 coupled across the first subset of battery cells 146A (in other words a first terminal of the DC-DC converter is coupled to the positive node 139 of the first subset of battery cells 146A, a second terminal of the DC-DC converter is coupled to a first terminal of the first DC-DC converter switch S3 and a second terminal of the first DC-DC converter switch S3 is coupled to the line terminal L 144A of the AC port 138) and a second DC-DC converter 154B and an associated switch S4 coupled across the second subset of battery cells 146B.

In this configuration, similar to the exemplary battery pack circuit of FIG. 9, when the battery pack 100' is coupled to an AC tool and/or a switch is activated, the battery pack 100' begins the AC waveform generation process. Based on a timing pattern of opening and closing the switches S1, S2, S3, S4 under control of the pack control module 148, the battery pack 100' is able to provide an AC power output waveform 158 in the form of a modified sine wave at the AC port 138. As an example, during the first ⅛ of the period P the first battery bank switch S1, the second battery bank switch S2, and the second DC-DC converter switch S4 are maintained open and the first DC-DC converter switch S3 is maintained closed and as such, there is a constant relatively low positive voltage at the AC output port 138—on the order of 5-10 volts. During the second and third ⅛s of the period P, the second battery bank switch S2, the first DC-DC converter switch S3, and the second DC-DC converter switch S4 are maintained open and the first battery bank switch S1 is maintained closed and as such, there is a constant relatively high positive voltage at the AC output port 138 equal to the voltage of the first subset of battery cells 146A—on the order of 170 volts. During the fourth ⅛ of the period P, the first DC-DC converter switch S3 is maintained closed and the first battery bank switch S1, the second battery bank switch S2, and the second DC-DC converter switch S4 are maintained open and as such, there is a constant relatively low positive voltage at the AC output port 138—on the order of 5-10 volts. During the fifth ⅛ of the period P, the second DC-DC converter switch S4 is maintained open and the first and second battery bank switches S1, S2, and the first DC-DC converter switch S3 are maintained closed, and as such there is a constant relatively low negative voltage at the AC output port 138—on the order of 5-10 volts. During the transition from the first DC-DC converter switch S3 opening and the second DC-DC converter switch S4 closing, there is a zero cross (a change from a positive voltage to a negative voltage). During the sixth and seventh ⅛s of the period P, the first battery bank switch S1, the first DC-DC converter switch S3, and the second DC-DC converter switch S4 are maintained open and the second battery bank switch S2 is maintained closed, and as such there is a constant relatively high negative voltage at the AC output port 138 equal to the voltage of the subset of battery cells 146B. And finally, during the eighth ⅛ of the period P, the second DC-DC converter switch S4 is maintained closed and the first battery bank switch S1, the second battery bank switch S2, and the first DC-DC converter switch S4 are maintained open, and as such there is a constant relatively low negative voltage at the AC output 138 on the order of 5-10 volts.

In this configuration, the battery pack is able to provide an AC power output waveform 158 that will operate virtually all AC powered devices.

Figure 15:
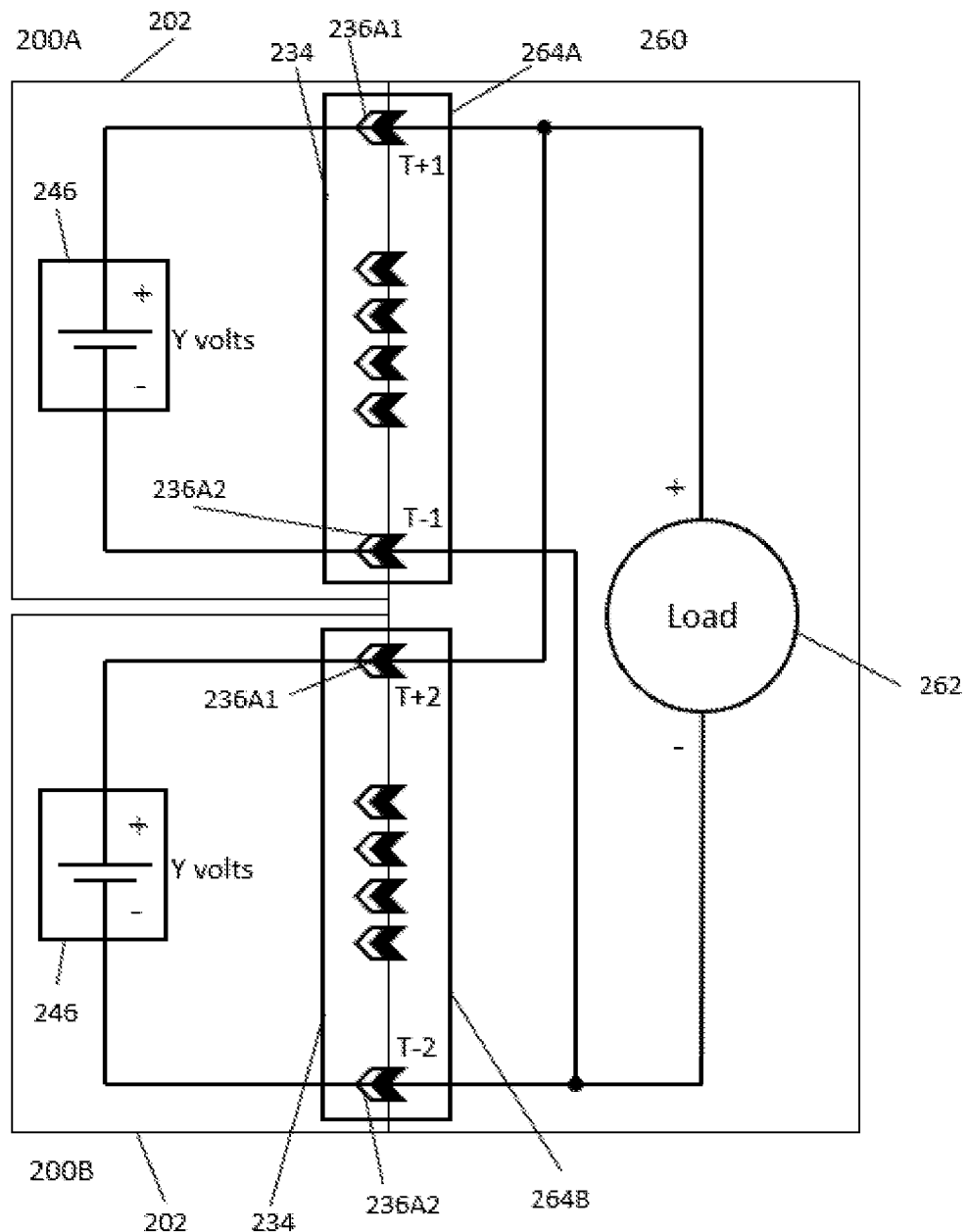
FIG. 15 illustrates a conventional DC power tool circuit diagram having two battery pack receptacles and a conventional battery pack circuit diagram with a battery pack coupled to each of the battery pack receptacles.
Figure 16:
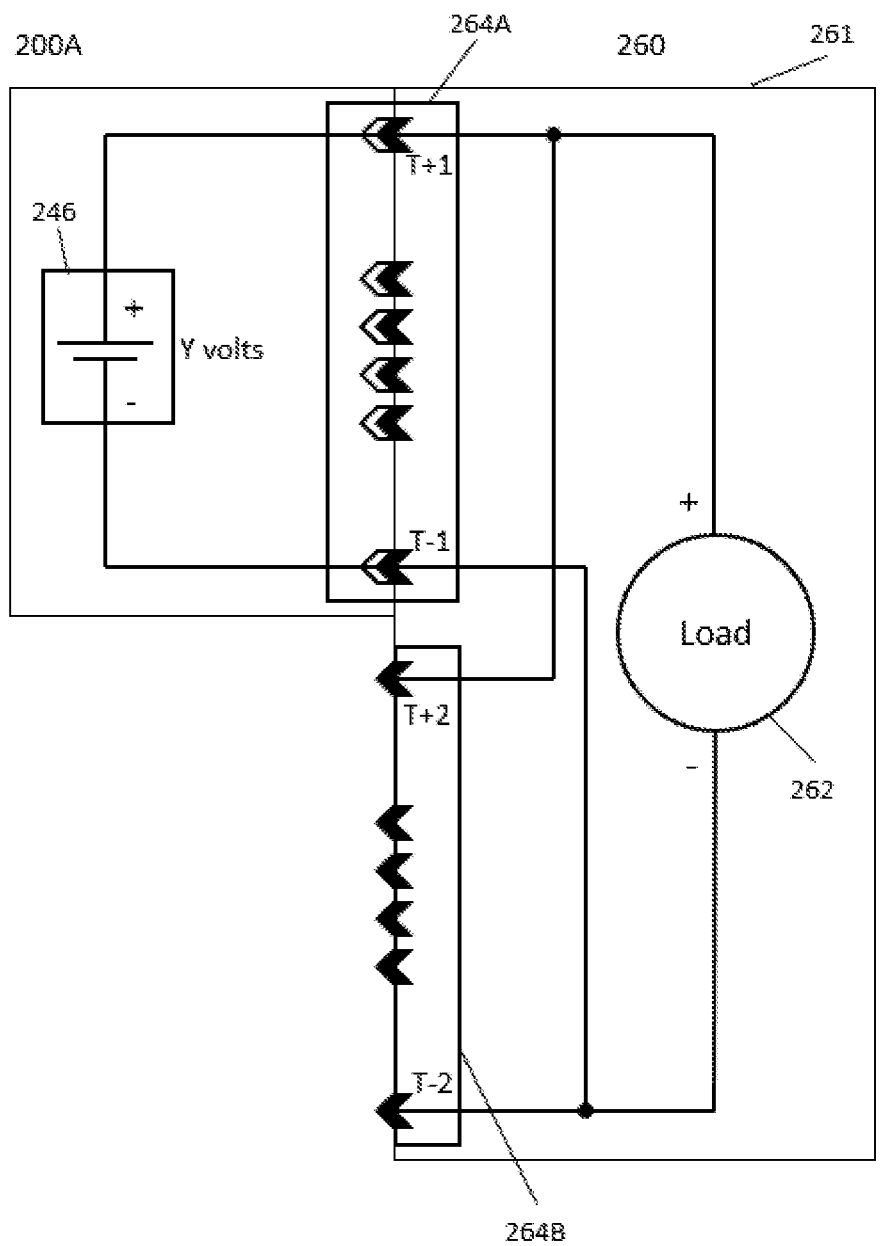
FIG. 16 illustrates the conventional DC power tool of FIG. 15 and a conventional battery pack coupled to one of the battery pack receptacles.

Referring to FIGS. 15 and 16, there is illustrated a conventional power tool 260 that operates using one and/or two battery packs 200. As shown in FIG. 15, the conventional multi-pack tool 260 includes, among other elements not illustrated, a load 262 and two battery pack receptacles or ports 264A, 264B. Each battery pack receptacle 264 includes a plurality of tool terminals 268 including a subset of power terminals 268A. The subset of power terminals 268A includes a positive tool terminal T+ 268A1 coupled to a positive terminal of the load 262 and a negative tool terminal T− 268A2 coupled to a negative terminal of the load 262.

As also shown in FIG. 15, the conventional high voltage battery pack 200 includes, among other elements not illustrated, a set of battery cells 246 having a positive terminal and a negative terminal and a voltage of Y volts and a tool receptacle or port 234. The tool receptacle 234 includes a plurality of battery pack terminals 236 including a subset of power terminals 236A. The subset of power terminals 236A includes a positive battery pack terminal B+ 236A1 coupled to the positive terminal of the set of battery cells 246 and a negative battery pack terminal B− 236A2 coupled to the negative terminal of the set of battery cells 246. In this example, the tool terminals 268 are represented as male blade terminals that extend from the tool housing 261—as noted by the solid arrow pointing out of and extending from the tool housing 261 and the battery pack terminals 236 are represented as female tulip terminals that are recessed in the battery pack housing 202—as noted by the unfilled arrow pointing into and recessed from the battery pack housing 202.

It is also shown that the positive tool terminal T+1 268A1 and T+2 268A3 of the two pack receptacles 264A, 264B are electrically coupled together and the negative tool terminals T−1 268A2 and T−2 268A4 of the two pack receptacles 264A, 264B are electrically coupled together such that when two battery packs 200A and 200B are coupled to the tool 260 the battery packs 200A, 200B will be coupled together in parallel to provide Y volts to the load 262. When the high voltage battery packs 200 are not coupled to the tool 260, a user cannot access the high voltage of the battery pack 200 because the battery pack terminals 236 are recessed. And, as illustrated in FIG. 15, when a battery pack 200 is coupled to both battery pack receptacles 234A, 234B there are no exposed terminals and as such, a user cannot access the high voltage of the battery pack 200. However, as illustrated in FIG. 16, when only one of the battery pack receptacles 234A is occupied by a battery pack 202A, the tool power terminals T+2 268A3, T−2 268A4 of the unoccupied battery pack receptacle 264B are exposed. And because, the exposed tool power terminals 268A3, 268A4 are coupled to the tool power terminals 268A1, 268A2 coupled to the high voltage battery pack 200 in parallel there is a high voltage potential across the exposed tool power terminals 268A3, 268A4 which is potentially harmful to a user.

Figure 17:
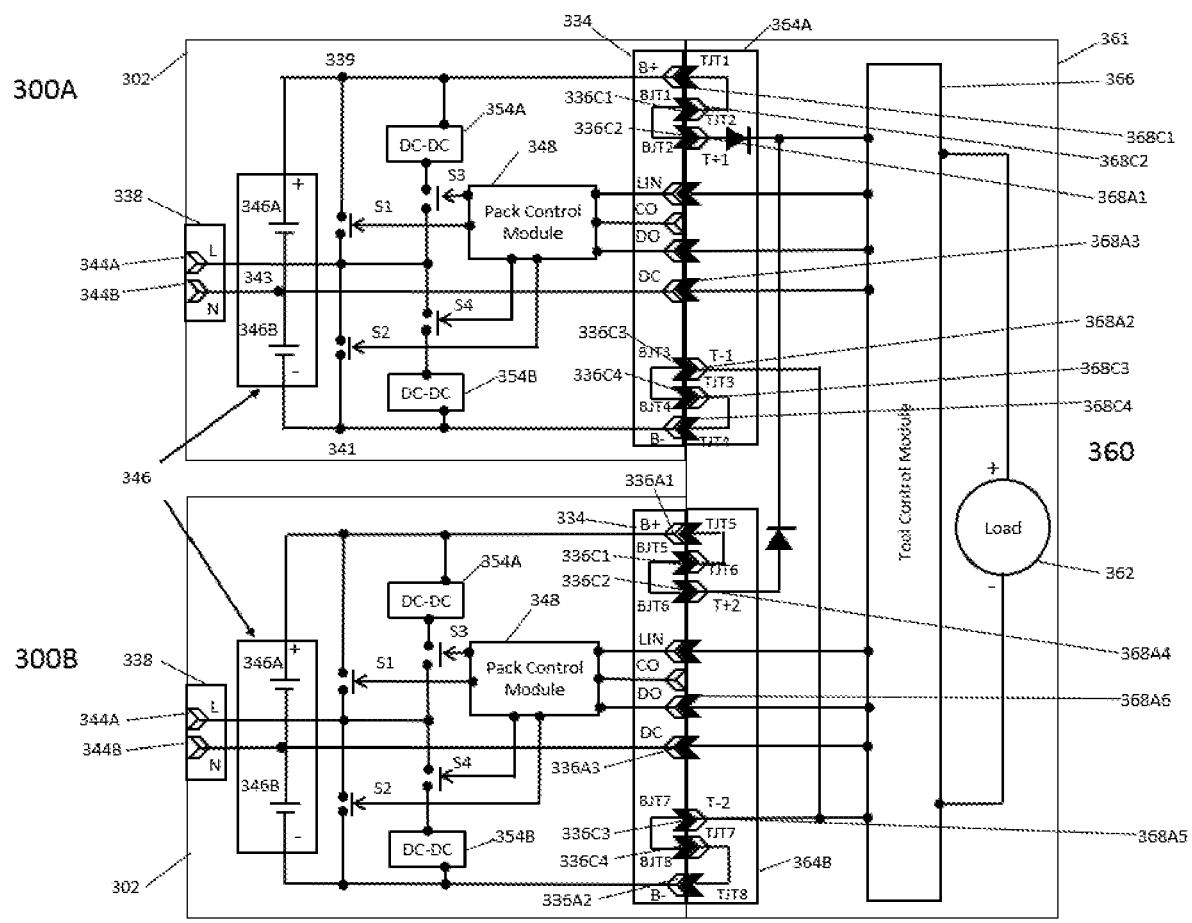
FIG. 17 illustrates an exemplary circuit diagram of a DC power tool of the present invention having two battery pack receptacles and another exemplary circuit diagram of two of the battery packs of FIG. 3 with the two battery packs coupled to the power tool.
Figure 18:
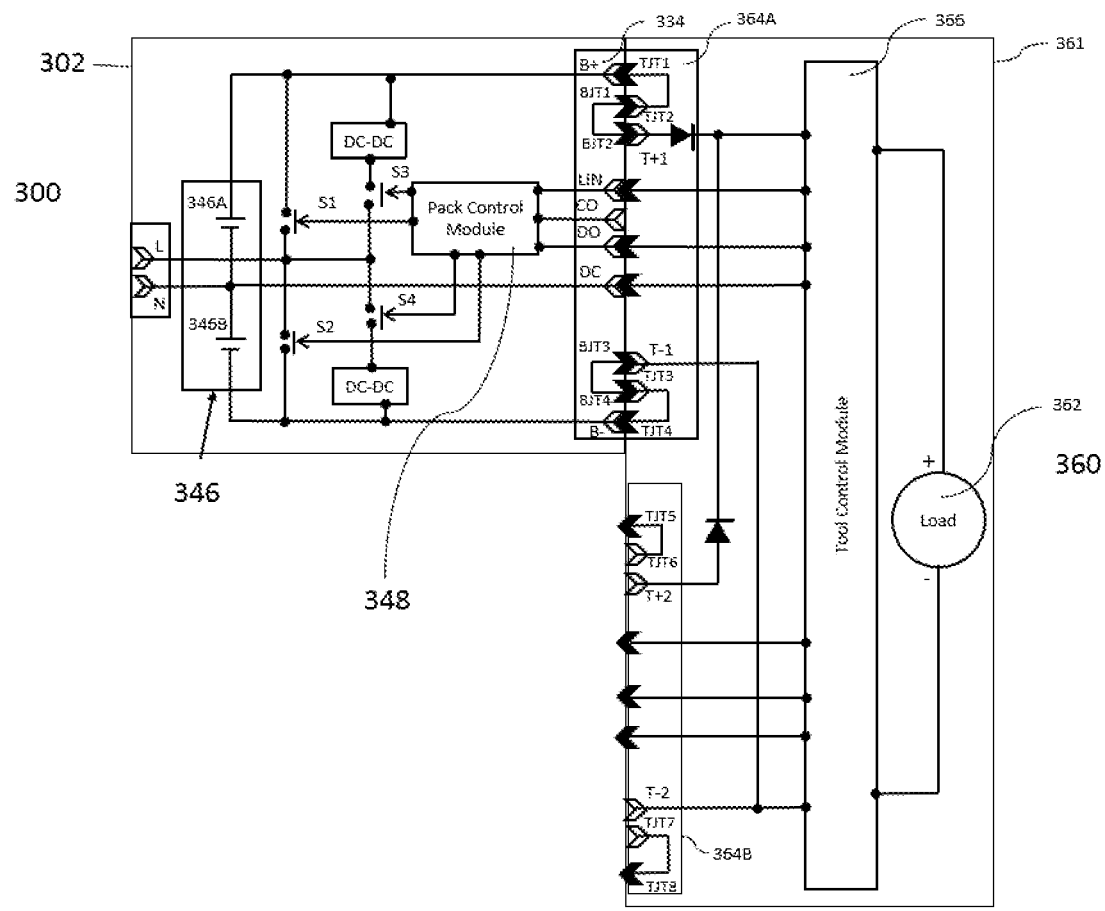
FIG. 18 illustrates one of the battery packs of FIG. 17 coupled to the power tool of FIG. 17 and one of the receptacles empty.
Figure 19:
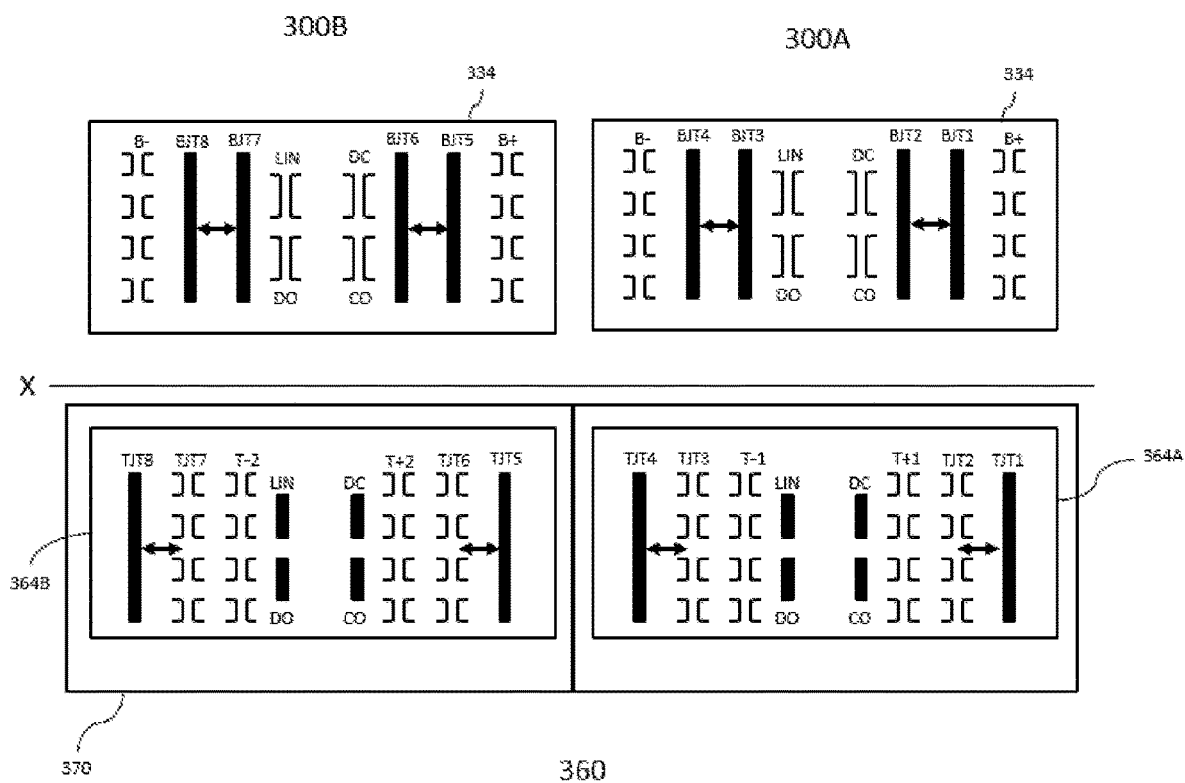
FIG. 19 illustrates an exemplary terminal configuration of the battery packs of FIG. 17 and the power tool of FIG. 17.

Referring to FIGS. 17-19, there is illustrated another exemplary power tool 360 including an exemplary multi-pack DC power tool circuit design and a battery pack 300 including an exemplary battery pack circuit diagram of the present invention. The battery pack 300 is very similar to the battery pack 100' of FIG. 12, described above. Specifically, the internal circuitry is the same. The battery pack 300 may include fewer or more internal components. The primary difference between the battery pack 300 and the battery pack 100' is in the tool receptacle 334 and the pack terminals 336. Similar to the conventional power tool 260 illustrated in FIGS. 15 and 16, the exemplary multi-pack DC power tool 360 of FIG. 17 includes, among other elements not illustrated, a load 362, a tool control module 364 and two battery pack receptacles or ports 366A, 366B. Each battery pack receptacle 366A, 366B includes a plurality of tool terminals 368 including a subset of power terminals 368A. The subset of power terminals 368A includes positive tool terminals T+1, T+2 (368A1, 368A3) coupled to a positive terminal of the load 362 and negative tool terminals T−1, T−2 (368A2, 368A4) coupled to a negative terminal of the load 362. In addition, the plurality of tool terminals 368 includes two pairs of jumper terminals 368C in each battery pack receptacle 366A, 366B. These will be described in more detail below.

As also shown in FIG. 17, the exemplary high voltage battery pack 300 of the present invention includes, among other elements not illustrated, a set of battery cells 346 having a positive terminal and a negative terminal and a voltage of Y volts and a tool receptacle or port 334. The tool receptacle 334 includes a plurality of battery pack terminals 336 including a subset of power terminals 336A. The subset of power terminals 336A includes a positive battery pack terminal B+(336A1) coupled to the positive terminal of the set of battery cells 346 and a negative battery pack terminal B− (336A2) coupled to the negative terminal of the set of battery cells 346. In addition, the plurality of battery pack terminals 336 includes two pairs of jumper terminals 336C in each tool receptacle 334.

In this example, the tool terminals 368 include a mix of male blade terminals and female tulip terminals and the battery pack terminals 336 include a mix of male blade terminals and female tulip terminals.

Still referring to FIG. 17, as with the conventional battery packs, the exemplary battery pack 300 of the present invention includes power terminals B+, B− (336A1, 336A2) configured as female tulip terminals that are recessed from the battery pack housing 302 or shrouded by the battery pack housing 302, as represented by the unfilled arrows, pointing into the housing 302 and set back from the housing wall. As such, when the exemplary battery pack 300 is not coupled to any device, the high voltage of the battery pack 300 is not accessible to a user at the battery pack power terminals 336A.

It is also shown that the positive tool terminal T+1, T+2 (368A1, 368A3) of the two receptacles 366A, 366B are electrically coupled together and the negative tool terminals T−1, T−2 (368A2, 368A4) of the two receptacles 366A, 366B are electrically coupled together such that when two battery packs 300A, 300B are coupled to the tool 360 the battery packs 300A, 300B will be coupled together in parallel to provide Y volts to the load 362. And when a battery pack 300 is coupled to both battery pack receptacles 366A, 366B there are no exposed terminals and as such, a user cannot access the high voltage of the battery pack 300.

Referring to FIGS. 17 and 18, quite distinct from the conventional battery pack and tool terminal configuration, the exemplary embodiment protects a user against access to the high voltage of the battery pack 300. Each battery pack 300 includes a tool receptacle 334 and the tool 360 includes a pair of battery pack receptacles 364A, 364B. As shown in the battery pack 300 coupled to the tool 360, the tool receptacle 334 includes a plurality of battery pack terminals 336. The plurality of battery pack terminals 336 includes a positive power terminal B+ in the form of a female tulip terminal that is recessed from the battery pack housing. Each battery pack receptacle 364 also includes a plurality of tool terminals 368. The plurality of tool terminals 368 includes a subset of tool jumper terminals 368C. A first tool jumper terminal TJT1 in the form of a male blade terminal that extends from the tool housing 361. This first tool jumper terminal TJT1 is positioned to mate with the battery pack positive power terminal B+. The first tool jumper terminal TJT1 is coupled, for example by a simple wire, to a second tool jumper terminal TJT2 in the form of a female tulip terminal that is recessed from the tool housing 361. The battery pack 300 includes a subset of battery pack jumper terminals 336C. A first battery pack jumper terminal BJT1 in the form of a male blade terminal that extends from the battery pack housing 302. The first battery pack jumper terminal BJT1 is positioned to mate with the second tool jumper terminal TJT2. The first battery pack jumper terminal BJT1 is coupled, for example by a simple wire, to a second battery pack jumper terminal BJT2 in the form of a male blade terminal that extends from the battery pack housing 302. The second battery pack jumper terminal BJT2 is positioned to mate with the first positive tool power terminal T+.

The tool receptacle 334 and each battery pack receptacle 368A, 368B may include a second set of jumper terminals 336C. Specifically, the plurality of tool terminals 368 includes a first negative power terminal T−1 in the form of a female tulip terminal that is recessed from the tool housing 361. The plurality of battery pack terminals 336 includes a third battery pack jumper terminal BJT3 in the form of a male blade terminal that extends from the battery pack housing 302. The third battery pack jumper terminal BJT3 is coupled, for example by a simple wire, to a fourth battery pack jumper terminal BJT4 in the form of a male blade terminal that extends from the battery pack housing 302. This fourth battery pack jumper terminal BJT4 is positioned to mate with a third tool jumper terminal TJT3 in the form of a female tulip terminal that is recessed from the tool housing 361. The third tool jumper terminal TJT3 is coupled, for example by a simple wire, to a fourth tool jumper terminal TJT4 in the form of a male blade terminal that extends from the tool housing 361. The fourth tool jumper terminal TJT4 is positioned to mate with the battery pack negative power terminal B− in the form of a female tulip terminal that is recessed form the battery pack housing 302.

The second battery pack receptacle 364B includes an identical set of terminals as the first battery pack receptacle 364A described above. As such, when the one of the battery pack receptacles 364A is occupied by a battery pack 300 and one of the receptacles 364B is not occupied by a battery pack 300B a user will not be able to access the high voltage of the coupled high voltage battery pack 300 even though the receptacles are coupled for parallel connection of multiple battery packs 300A, 300B.

Specifically, with reference to FIG. 18, because the first male tool jumper terminal TJT5 of the open battery pack receptacle 364B is electrically isolated from the associated positive tool terminal T+2 (368A3) and the second male terminal TJT8 of the open battery pack receptacle 364B is electrically isolated from the associated negative tool terminal T−2 (368A4), regardless of the voltage of the high voltage battery pack 300A coupled to the battery pack receptacle 364A there is no electric potential across the exposed male terminals TJT5, TJT8 of the open battery pack receptacle 364B.

Referring to FIG. 19, there is illustrated an exemplary terminal configuration within the battery pack port 334 for a battery pack 300 illustrated in FIGS. 3-8 and an exemplary terminal configuration within the tool port 364 for a power tool 360 illustrated in FIG. 43, both of which are illustrated schematically in FIGS. 17 and 18. The view of the battery packs 300 is that of FIG. 5 and the view of the power tool 360 is into a device battery pack receiving chamber 370 in a direction indicated by the arrow marked D. The battery pack ports 334 and tool ports 364 would mate by folding the battery packs 300 and the tool 360 about the line marked X and out of the page. As such, upon coupling/mating the battery packs 300 with the tool 360 the battery pack terminals 336 electrically and mechanically couple/mate with the tool terminals 368. With regard to the first battery pack 300A, the positive battery pack power terminal B+ 336A1 (a recessed female tulip terminal) mates with the first tool jumper terminal TJT1 (a projected male blade terminal), the second tool jumper terminal TJT2 (a recessed female tulip terminal) mates with the first battery pack jumper terminal BJT1 (a projected male blade terminal), the second battery pack jumper terminal BJT2 (a projected male blade terminal) mates with the first positive tool power terminal T+1 368A1 (a recessed female tulip terminal), the first negative tool power terminal T−1 368A2 (a recessed female tulip terminal) mates with the third battery pack jumper terminal BJT3 (a projected male blade terminal), the fourth battery pack jumper terminal BJT4 (a projected male blade terminal) mates with the third tool jumper terminal TJT3 (a recessed female tulip terminal) and the fourth tool jumper terminal TJT4 (a projected male blade terminal) mates with the negative battery pack power terminal B− 336A2 (a recessed female tulip terminal). As indicated by the arrows between the various terminals, internal to the tool 360 or battery pack 300, as the case may be, terminals are coupled to each other. Specifically, the first battery pack jumper terminal BJT1 is coupled within the battery pack 300A to the second battery pack jumper terminal BJT2 and the third battery pack jumper terminal BJT3 is coupled within the battery pack 300A to the fourth battery pack jumper terminal BJT4 and the first tool jumper terminal TJT1 is coupled within the tool 360 to the second tool jumper terminal TJT2 and the third tool jumper terminal TJT3 is coupled within the tool 360 to the fourth tool jumper terminal TJT4.

With regard to the second battery pack 300B, the battery pack terminals 336 couple/mate with the tool terminals 368 in the same manner as the battery pack terminals 336 of the first battery pack 300A described above.

As illustrated in FIGS. 17-19 and 43, there is presented a power tool 360 having a pair of battery pack receptacles 364A, 364B. The battery pack receptacles 364 are each configured to receive a battery pack 300. Each receptacle includes a tool port. The tool port includes a plurality of terminals 336 (also referred to as a set of tool terminals). Each tool port is configured to couple/mate with a battery pack port 334 and the plurality of tool terminals 368 are configured to couple/mate with the plurality of battery pack terminals 336.

In the battery packs described above, it is possible that one subset of battery cells drains differently than the other subset of battery cells, either due to uneven power draw during the positive and negative half AC cycles described above, impedance difference between the battery cells of one subset of battery cells as compared to the battery cells of the other subset of cells or power drain from electronics (not shown) associated with one subset of battery cells as compared to electronics (not shown) associated with the other subset of battery cells. As such, it is possible that a voltage imbalance will develop between the two subsets of battery cells. It is desirable to address and correct this imbalance during charging of the battery pack. However, it is also desirable to keep the charging voltage as low as possible to reduce the size and costs of the battery pack charger.

Figure 20:
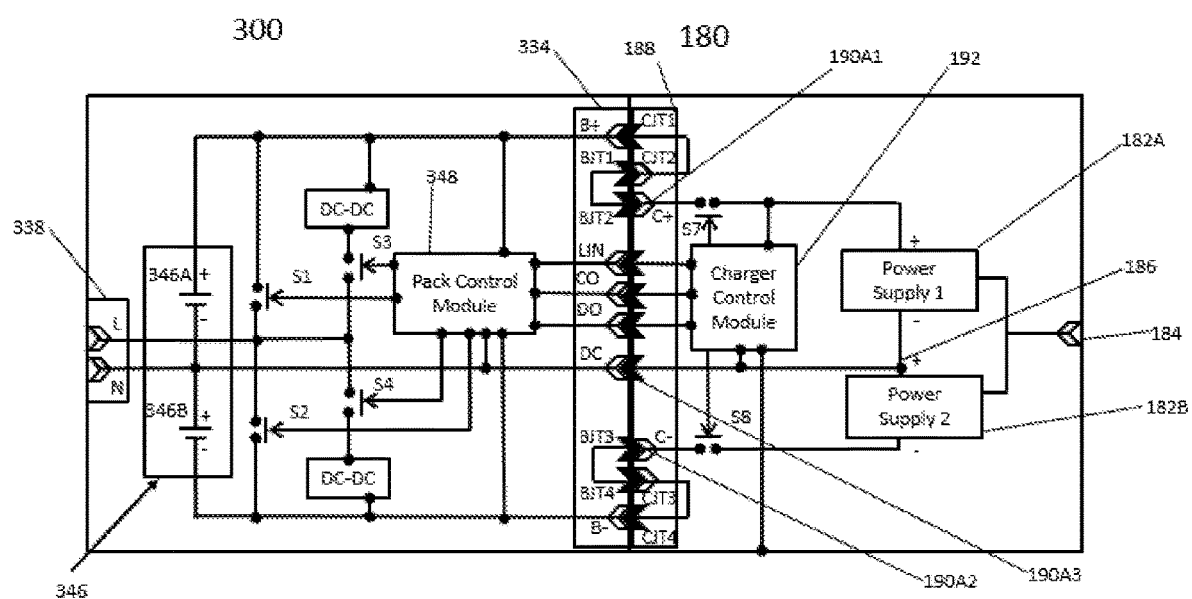
FIG. 20 illustrates the circuit diagram of one of the battery packs of FIG. 17 coupled to an exemplary circuit diagram of an exemplary battery pack charger.

To this end, as illustrated in FIG. 20, a first exemplary embodiment of a battery pack charger 180 is presented. The battery pack charger 180 includes a terminal configuration and control process that leverages the terminal configuration of the battery packs described above and the relationship of the subsets of battery cells. In the embodiment illustrated in FIG. 20, the battery pack charger 180 includes a first power supply 182A and a second power supply 182B. Both of the power supplies 182A, 182B include an input coupled to an AC input port 184. The AC input port 184 is configured to couple to a supply of AC power, for example, the AC mains line through a wall receptacle. The power supplies 182A, 182B are coupled in series with a node 186 therebetween. More particularly, both of the power supplies 182A, 182B include a positive terminal and a negative terminal. The negative terminal of the first power supply 182A is coupled to the positive terminal of the second power supply 182B.

The battery pack charger 180 also includes a battery pack charger port 188. The battery pack charger port 188 is configured to couple/mate with the battery pack port 334. The battery pack charger port 188 includes a plurality of terminals 190 (also referred to as a set of battery charger terminals). In the exemplary embodiment illustrated in FIG. 20, the plurality of battery pack charger terminals 190 are configured in the same configuration of as the tool port 366 of the DC power tool 360 illustrated in FIGS. 17-19 and described above. The battery pack charger 180 also includes a charger control module 192 and pair of charging switches S7, S8. The charging switches S7, S8 may be a variety of types of switches including transistors, relays, opto-couplers, etc. The charger control module 192 controls the charging process and the charging switches S7, S8 as described in more detail below. In this exemplary embodiment, the first charging switch S7 includes a first terminal coupled to the charger control module 192 for controlling the charging switch S7, a second terminal coupled to the positive terminal of the first power supply 182A and a third terminal coupled to a positive charging terminal C+ of the battery pack charger 180 and the second charging switch S8 includes a first terminal coupled to the charger control module 192 for controlling the charging switch S8, a second terminal coupled to the negative terminal of the second power supply 182B and a third terminal coupled to a negative charging terminal C− of the battery pack charger

180. When coupled to a battery pack 300, for example the battery pack illustrated in FIGS. 17-20 and described above with respect to FIGS. 17-19, the first power supply 182A may provide a charging current/voltage (in conjunction with a third (common node) charging terminal DC 190A3 described in more detail below), through the first charging switch S7, to the battery pack through the positive charging terminal C+, the second battery pack jumper terminal BJT2, the first battery pack jumper terminal BJT1, a second battery pack charger jumper terminal CJT2, a first battery pack jumper terminal CJT1 and the positive battery pack terminal B+. Furthermore, the second power supply 182B may provide a charging current/voltage (in conjunction with the third charging terminal DC), through the second charging switch S8, to the battery pack through the negative charging terminal C−, the third battery pack jumper terminal BJT3, the fourth battery pack jumper terminal BJT4, a third battery pack charger jumper terminal CJT3, a fourth battery pack charger jumper terminal CJT4 and the negative battery pack terminal B−.

As noted above, the battery pack charger 180 includes a third charging terminal DC 190A3. The third charging terminal DC 190A3 is coupled to the node between the first and second power supplies 182A, 182B. In other words, the third charging terminal DC 190A3 is coupled to the negative terminal of the first power supply 182A and the positive terminal of the second power supply 182B. As such, the third charging terminal DC 190A3 is able to provide a negative current/voltage and/or a positive current/voltage to the battery pack 300 depending upon which of the charging switches S7, S8 are closed.

In addition, the battery pack 300 illustrated in FIG. 20 also includes a third (common node) power terminal DC. The third power terminal DC is positioned and configured to couple/mate with the third charging terminal DC of the battery pack charger. In this embodiment, the battery pack charger third charging terminal DC is a male blade terminal projecting from the battery pack charger housing and the battery pack third power terminal DC is a female tulip terminal recessed in the battery pack housing 302.

The battery pack third power terminal DC is coupled to a node between the subsets of battery cells. In other words, the first subset of battery cells 346A includes a positive terminal and a negative terminal and the second subset of battery cells 346B includes a positive terminal and a negative terminal. The positive terminal of the first subset of battery cells 346A is coupled to the positive power terminal B+ of the battery pack and the negative terminal of the first subset of battery cells 346A is coupled to the positive terminal of the second subset of battery cells 346B and the negative terminal of the second subset of battery cells 346B is coupled to the negative power terminal B−. And the battery pack third power terminal DC is coupled to the node coupling the negative terminal of the first subset of battery cells 346A (coupling the third power terminal DC to the negative terminal of the first subset of battery cells 346A) and the positive terminal of the second subset of battery cells 346B (coupling the third power terminal DC to the positive terminal of the second subset of battery cells 346B).

Upon coupling the battery pack 300 to the battery pack charger 180, the pack control module may communicate with the charger control module and vice versa via one of the signal (communication) terminals LIN, CO to provide relevant information about the battery pack to the charger, e.g., number of battery cells, type of battery cell, state of charge of battery cell or a subset of battery cells, battery pack health, and information about the battery pack charger to the battery pack, e.g., maximum charging current, minimum charging current. Based on various parameters, such as state of charge of the subsets of battery cells 346A, 346B, the charger control module controls the charging of the subsets of battery cells 346A, 346B. The charger control module controls the charging switches S7, S8 to provide a charging current/voltage to the subsets of battery cells 346A, 346B. More particularly, to provide a charging current/voltage to the first subset of battery cells 346A and not the second subset of battery cells 346B, the charger control module closes the first charging switch S7 and opens the second charging switch S8. This state couples the first power supply to the first subset of battery cells 346A to provide a charging current/voltage to the first subset of battery cells 346A and not the second subset of battery cells 346B. And to provide a charging current/voltage to the second subset of battery cells 346B and not the first subset of battery cells 346A, the charger control module closes the second charging switch S8 and opens the first charging switch S7. This state couples the second power supply to the second subset of battery cells 346B to provide a charging current/voltage to the second subset of battery cells C2B and not the first subset of battery cells 346A. Alternatively, the charge control module may close both the first charging switch S7 and the second charging switch S8 to provide charging current/voltage to the first subset of battery cells 346A and the second subset of battery cells 346B simultaneously.

Alternatively, the pack control module may provide instructions to the charger control module regarding which subset of battery cells to charge. The control modules may operate to charge the subsets of battery cells in various manners, including charging one of the subsets of battery cells until that subset of battery cells is fully charged and then charging the other subset of battery cells until that subset of battery cells is fully charged or charging a first subset of battery cells until that subset of battery cells reaches a threshold voltage and then charging the other subset of battery cells until that subset of battery cells reaches a threshold and then returning to the first subset of battery cells for additional charging until both subset of battery cells are fully charged or charging a first subset of battery cells for a period of time and then charging the other subset of battery cells for a period of time.

Figure 21:
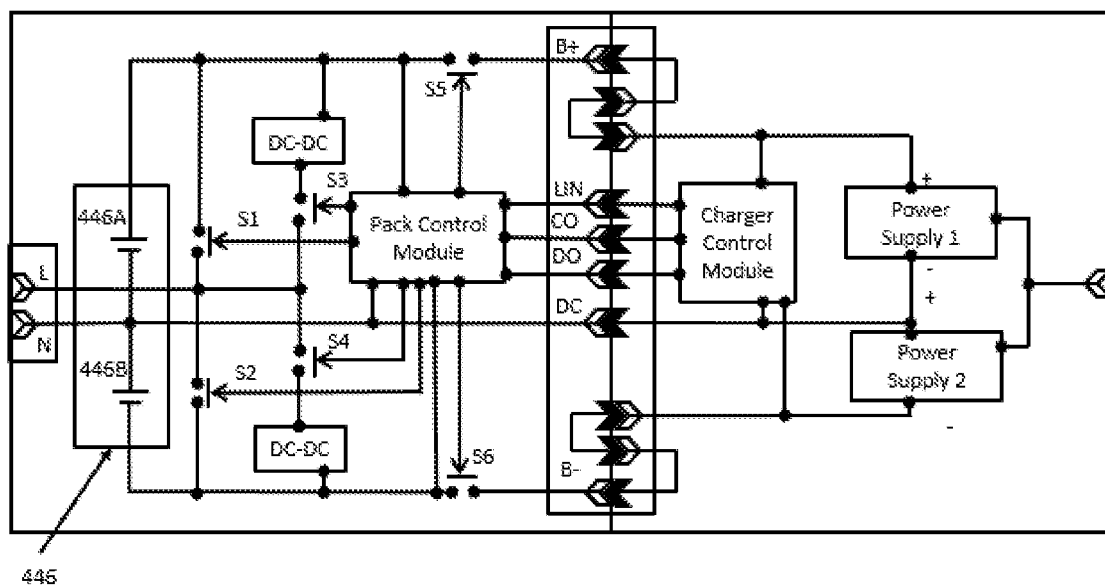
FIG. 21 illustrates another exemplary circuit diagram of a battery pack of FIG. 3 coupled to another exemplary circuit diagram of another exemplary battery pack charger.

FIG. 21 illustrates another exemplary embodiment of a battery pack 400 and another exemplary embodiment of a battery pack charger 280 for charging the battery pack 400. In these embodiment, the battery pack charger does not include the first and second charging switches S7, S8 and the battery pack does include first and second charging switches S5, S6. As such, in order to control the charging of the battery pack, the pack control module opens and closes the first and second charging switches S5, S6 in accordance with the desired charging process. The pack control module may implement the desired charging process based on information regarding the subsets of battery cells 446A, 446B and/or the battery pack charger. Alternatively, the charger control module may control the pack control module to determine and control the charging process. In all other respects, the charging process of this embodiment is the same as the charging process described above.

Figure 22:
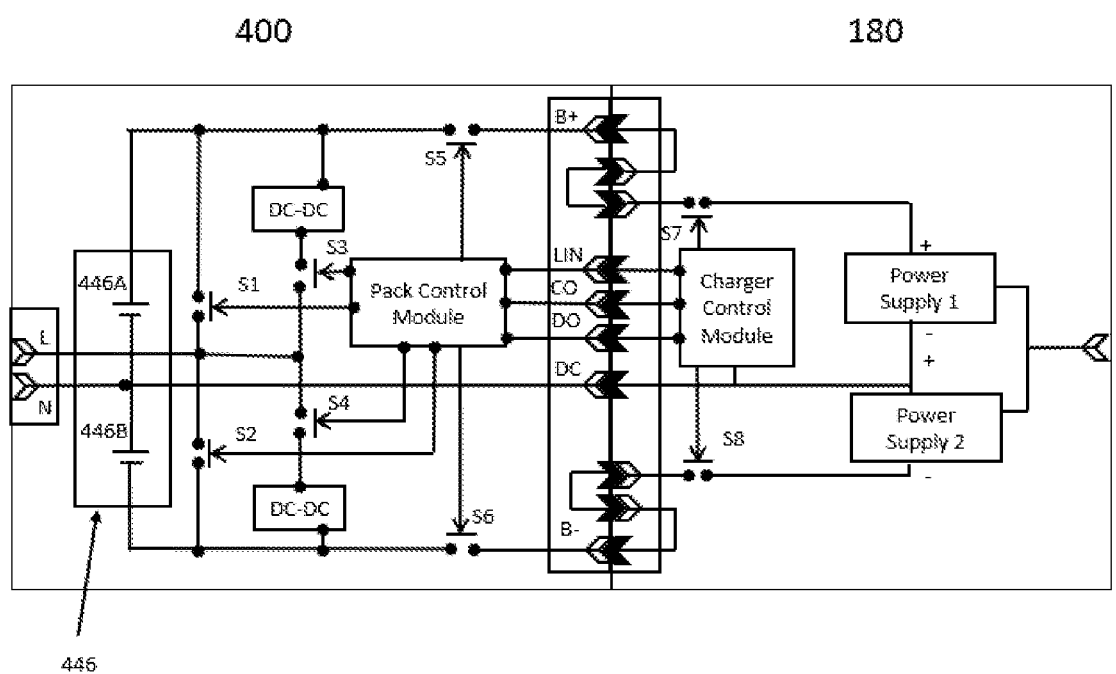
FIG. 22 illustrates the circuit diagram of the battery pack of FIG. 21 coupled to the circuit diagram of the battery pack charger of FIG. 20.

FIG. 22 illustrates the exemplary embodiment of the battery pack 400 of FIG. 21 coupled/mated to the exemplary embodiment of the battery pack charger 180 of FIG. 20. In this configuration, both the battery pack and the battery pack charger include charging switches S5, S6, S7, S8. This configuration provides an extra layer of fault protection. In this configuration, either the pack control module or the charger control module may control all of the charging switches S5, S6, S7, S8 or may control the charging switches of their respective device. In other respects, the charging process is the same as the process described above.

Figure 23:
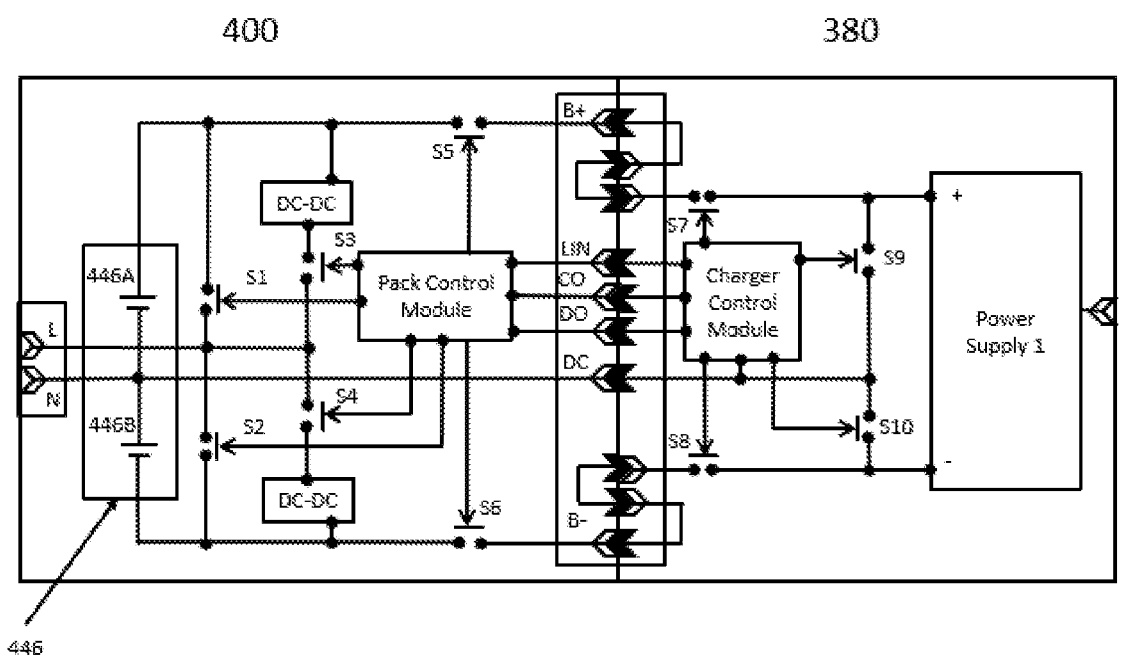
FIG. 23 illustrates the circuit diagram of the battery pack of FIG. 21 coupled to another exemplary circuit diagram of another exemplary battery pack charger.

FIG. 23 illustrates the exemplary embodiment of the battery pack 400 of FIG. 21 coupled/mated to another exemplary embodiment of a battery pack charger 380. This embodiment of the battery pack charger 380 includes a single power supply 382. The battery pack charger 380 also includes an additional pair of charging switches S9, S10. The third battery pack charger charging switch S9 includes a first terminal coupled to the charger control module for controlling the third charging switch S9, a second terminal coupled to the positive terminal of the power supply and a third terminal coupled to the third charging terminal DC. The fourth battery pack charger charging switch S10 includes a first terminal coupled to the charger control module for controlling the fourth charging switch S10, a second terminal coupled to the third charging terminal DC and a third terminal coupled to the negative terminal of the power supply. During the charging process, to charge the first subset of battery cells 446A, the first battery pack charging switch S5 is closed, the first battery pack charger charging switch S7 is closed and the fourth battery pack charger charging switch S10 is closed and the second battery pack charging switch S6 is opened, the second battery pack charger charging switch S8 is opened and the third battery pack charger charging switch 29 is opened. As such, a charging current/voltage is provided to the positive charging terminal C+ and the third charging terminal DC to provide a charging current/voltage to the first subset of battery cells 446A.

To charge the second subset of battery cells 446B, the first battery pack charging switch S5 is opened, the first battery pack charger charging switch S7 is opened and the fourth battery pack charger charging switch S10 is opened and the second battery pack charging switch S6 is closed, the second battery pack charger charging switch S8 is closed and the third battery pack charger charging switch S9 is closed. As such, a charging current/voltage is provided to the third charging terminal DC and the negative charging terminal C− to provide a charging current/voltage to the second subset of battery cells 446B.

The exemplary battery pack charger 380 of FIG. 23 may also be used to charge the battery pack 300 illustrated in FIG. 20. In such a configuration the set of battery cells 346 and the subsets of battery cells 346A, 346B may be charged in a manner described above.

Figure 24:
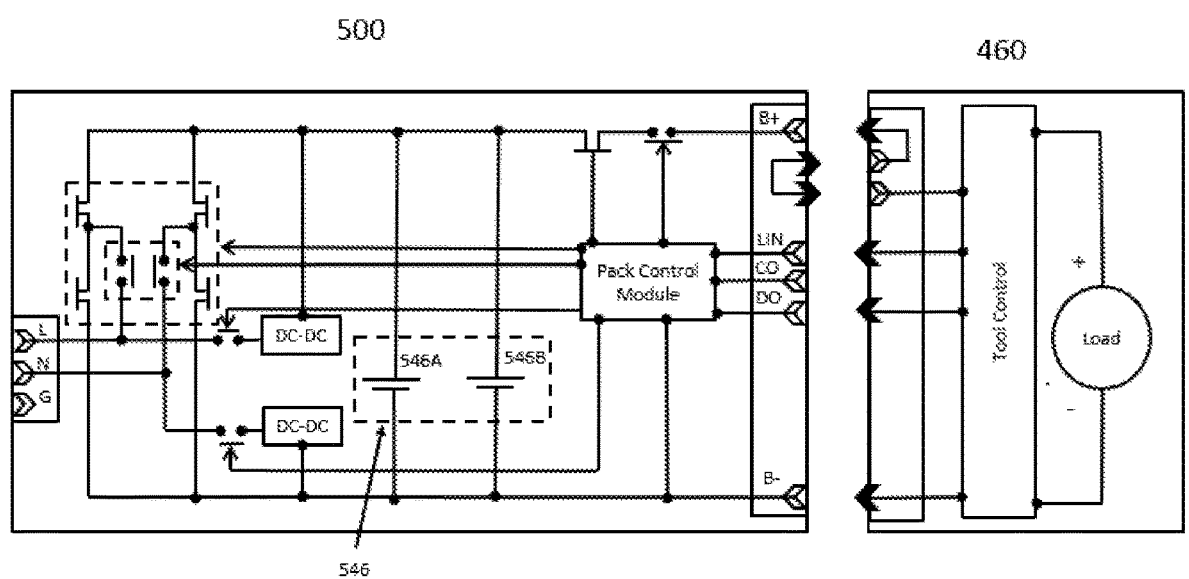
FIG. 24 illustrates another exemplary circuit diagram of the battery pack of FIG. 3 and another exemplary circuit diagram of a DC power tool.
Figure 25:
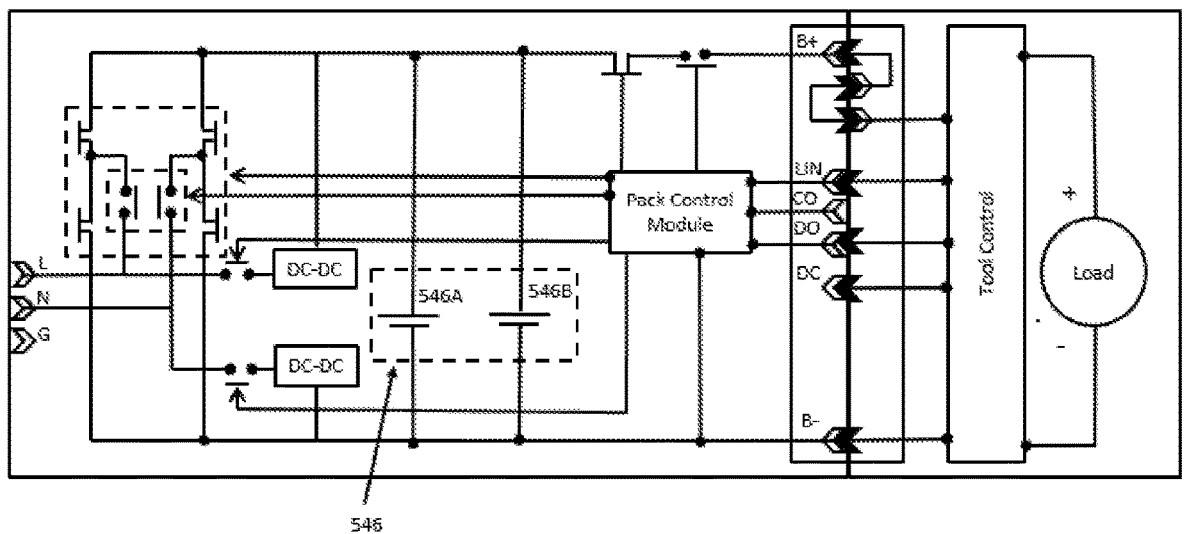
FIG. 25 illustrates the battery pack of FIG. 24 coupled to the power tool of FIG. 24.
Figure 26:
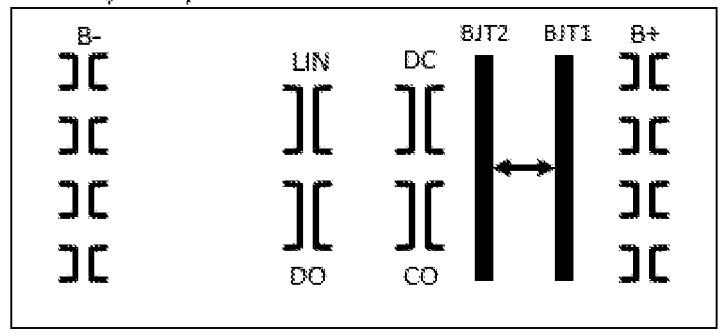
FIG. 26 illustrates an exemplary terminal configuration of the battery pack of FIG. 24 and the power tool of FIG. 24.
Figure 26:
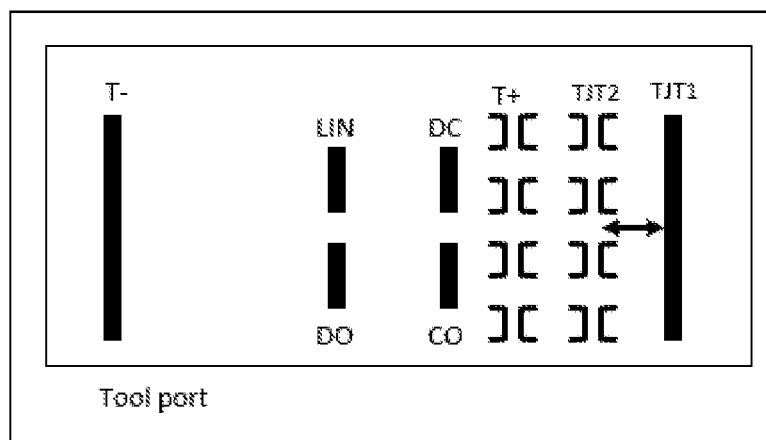

FIGS. 24 and 25 illustrate another exemplary embodiment of a battery pack 500 in accordance with the present invention and another exemplary embodiment of a DC power tool 460 in accordance with the present invention. The battery pack 500 includes a pack control module. The pack control module may comprise a variety of electrical and electronic components including but not limited to a microprocessor, a microcontroller, an application specific integrated circuit, and memory circuits necessary to carry out command and control functions of the battery pack, as will be described in more detail below. The battery pack also includes a battery pack DC port and a battery pack AC port. The battery pack DC port includes a plurality of battery pack DC terminals (also referred to as a set of battery pack DC terminals) and is capable of providing a DC waveform to a DC power driven (powered) device coupled/mated thereto. The plurality of battery pack DC terminals includes a subset of power terminals. The subset of power terminals includes a positive power terminal B+ and a negative power terminal B−. The plurality of battery pack DC terminals also includes a subset of signal (communication) terminals including an identification/information terminal LIN, a charge control terminal CO and a discharge control terminal DO. The signal terminals transmit/receive information to/from the pack control module. The plurality of battery pack DC terminals may also include a subset of jumper terminals BJT1, BJT2. The jumper terminals serve a similar role to the jumper terminals described above.

The battery pack AC port includes a plurality of battery pack terminals and is capable of providing an AC waveform to an AC power driven (powered) device coupled/mated thereto. The AC port may take the form of a conventional three-pronged AC receptacle including a line terminal L, a neutral terminal N and a ground terminal G.

The battery pack also includes a battery bank 546 comprising a plurality of battery cells (also referred to as a set of battery cells). The battery bank 546 comprises a first sub-bank of battery cells 546A (also referred to as a first subset of battery cells) and a second sub-bank of battery cells 546B (also referred to as a second subset of battery cells). Each subset of battery cells may include at least one battery cell. In a preferred embodiment, each subset of battery cells includes 45 battery cells wherein each battery cell has a nominal voltage of approximately 3.8 volts and a maximum voltage of approximately 4.2 volts. As such, each subset of battery cells has a nominal voltage of approximately 171 volts and a maximum voltage of approximately 189 volts. The first and second subsets of battery cells are coupled in parallel. In other words, a positive terminal of the first subset of battery cells is electrically coupled to a positive terminal of the second subset of battery cells and a negative terminal of the first subset of battery cells is electrically coupled to a negative terminal of the second subset of battery cells. Furthermore, the positive terminals of the first and second subsets of battery cells are electrically coupled to the positive power terminal B+ and the negative terminals of the first and second subsets of battery cells are electrically coupled to the negative power terminal B−. As such, the battery pack may provide a DC waveform of approximately 171 volts (nominal) at the DC port across the power terminals B+, B−.

The battery pack also includes an inverter, such as an H bridge inverter, as is well known in the art. The inverter comprises four transistors that are electrically coupled to the battery bank 546 and are controlled by the pack control module to produce an AC waveform at the AC output port. The AC waveform generated by the inverter and provided at the AC output port may be a modified sine wave, as described above. In alternate embodiments, the inverter may generate other AC waveforms, for example, a pure sine wave or a square wave. The battery pack may also include a set of DC-DC converters coupled between the battery bank C5 and the AC output port to provide a constant low positive and negative voltage at the AC output port, as described above with regard to FIGS. 12-14. The battery pack may also include an inverter activation switch. The inverter activation switch may include a pair (also referred to as a set) of inverter activation switches. The inverter activation switches may be electrical (transistor) or mechanical (relay) switches. One of the pair of activation switches coupled between one of the inverter transistors and the line terminal L and one of the pair of activation switches coupled between one of the inverter transistors and the neutral terminal N. The inverter activation switch is controlled by the pack control module. As noted above, the battery pack housing may include an inverter on/off switch to be actuated by a user when the battery pack is coupled/mated to an AC powered device. The inverter on/off switch is coupled to the pack control module. When the user actuates the inverter on/off switch to the on position, the pack control module closes the inverter activation switches coupling the inverter to the AC terminals L, N and begins operation of the inverter to produce the AC waveform at the AC output port.

As such, this embodiment provides another example of a battery pack that is capable of provide a high voltage DC waveform at a DC output port while simultaneously providing a utility quality AC waveform at an AC output port from a single set of battery cells.

Figure 27:
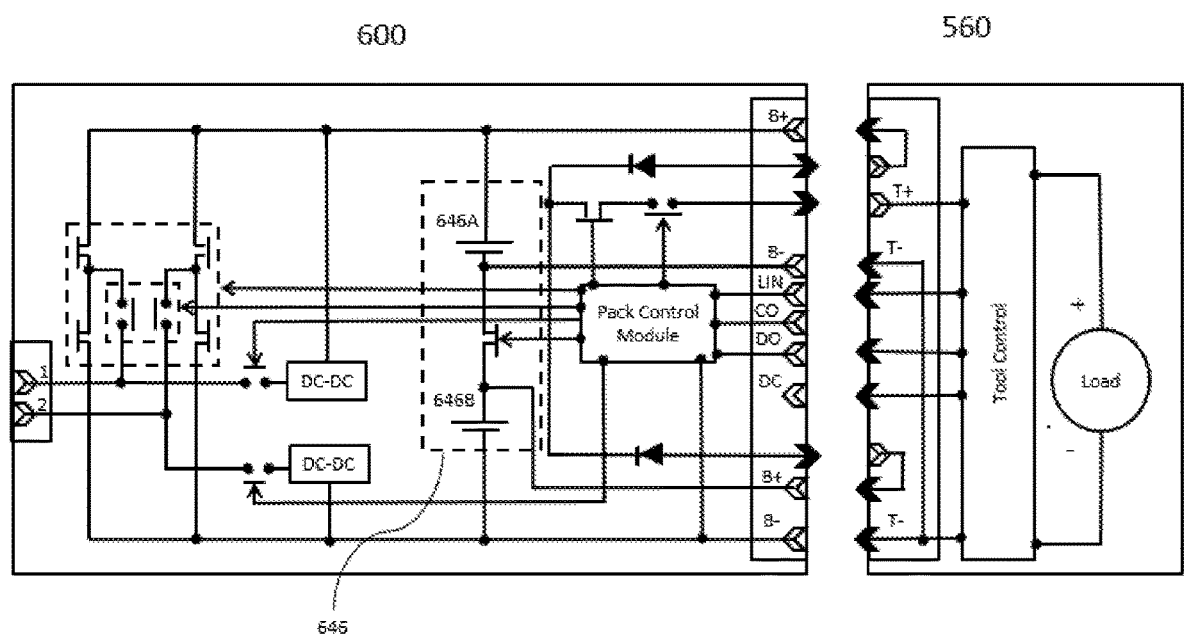
FIG. 27 illustrates another exemplary circuit diagram of the battery pack of FIG. 3 and another exemplary circuit diagram of a DC power tool.
Figure 28:
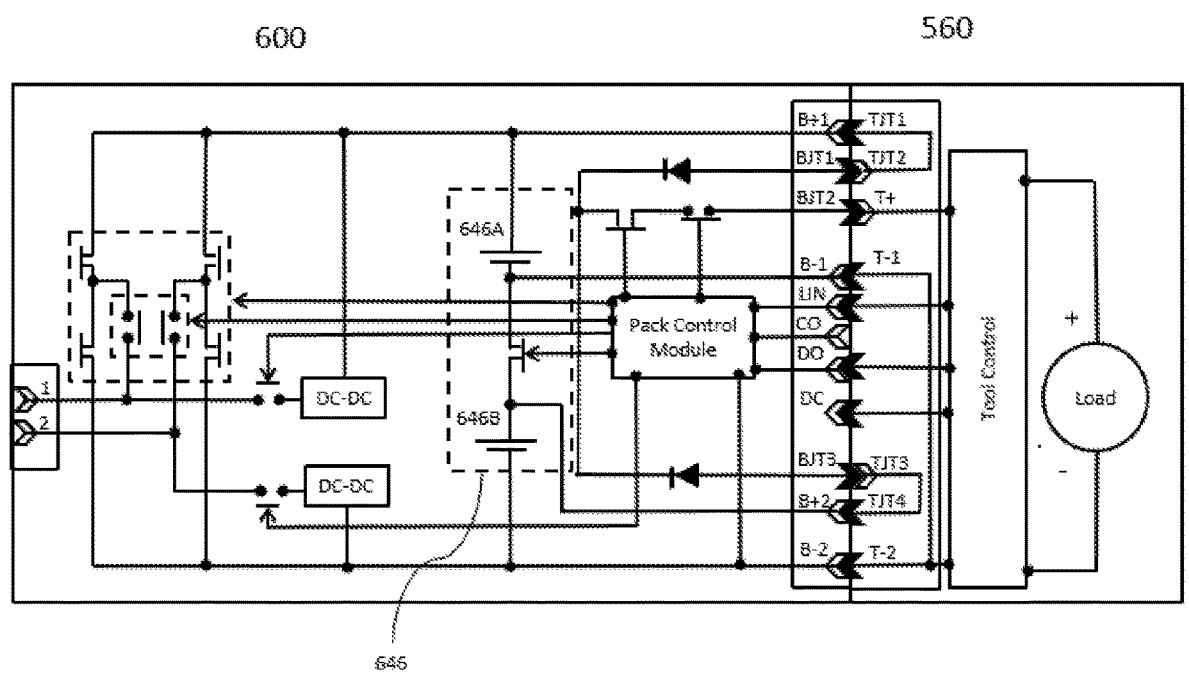
FIG. 28 illustrates the battery pack of FIG. 27 coupled to the power tool of FIG. 27.
Figure 28A:
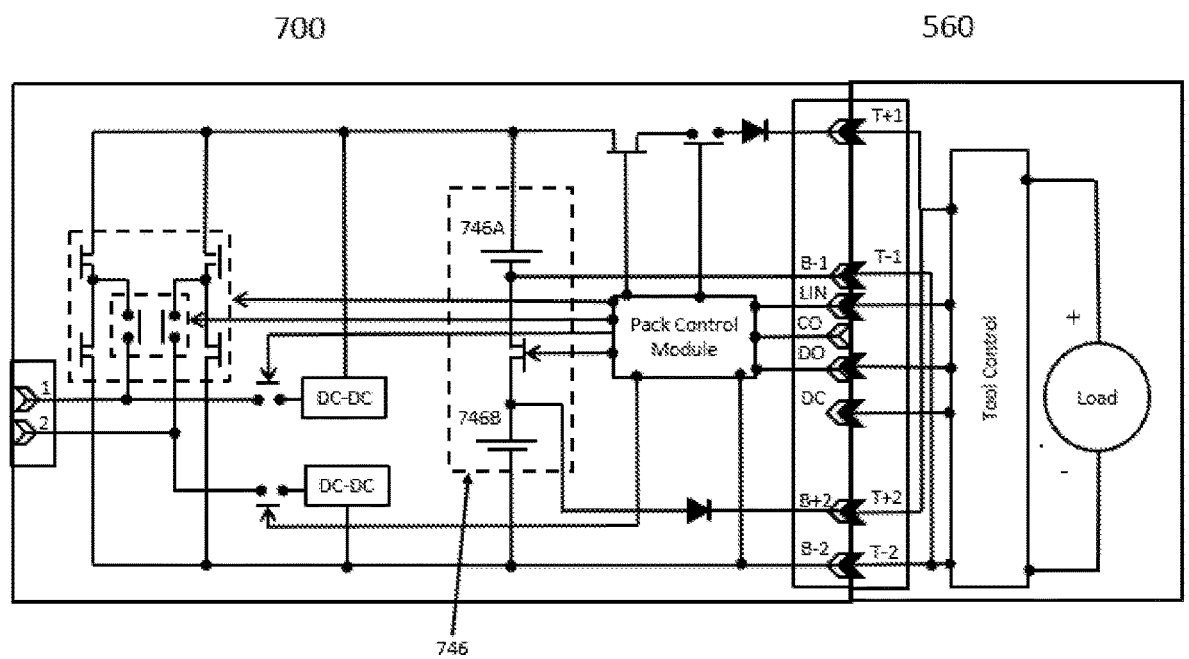
FIG. 28A illustrates an alternative exemplary embodiment of a battery pack and a power tool.
Figure 29:
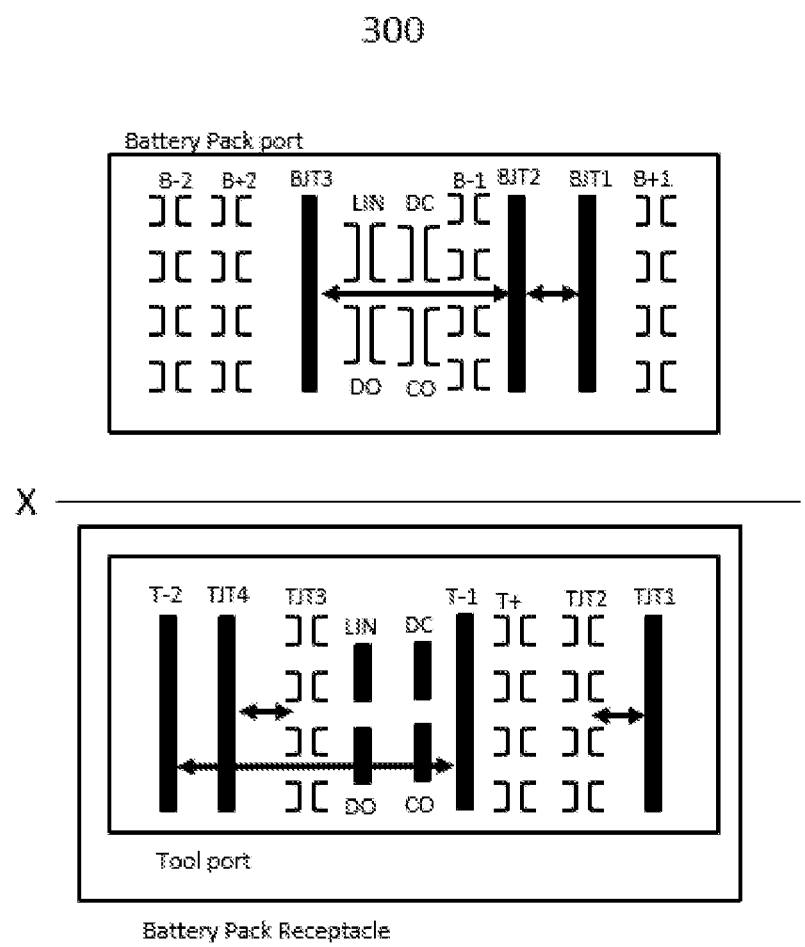
FIG. 29 illustrates an exemplary terminal configuration of the battery pack of FIG. 27 and the power tool of FIG. 27.
Figure 30:
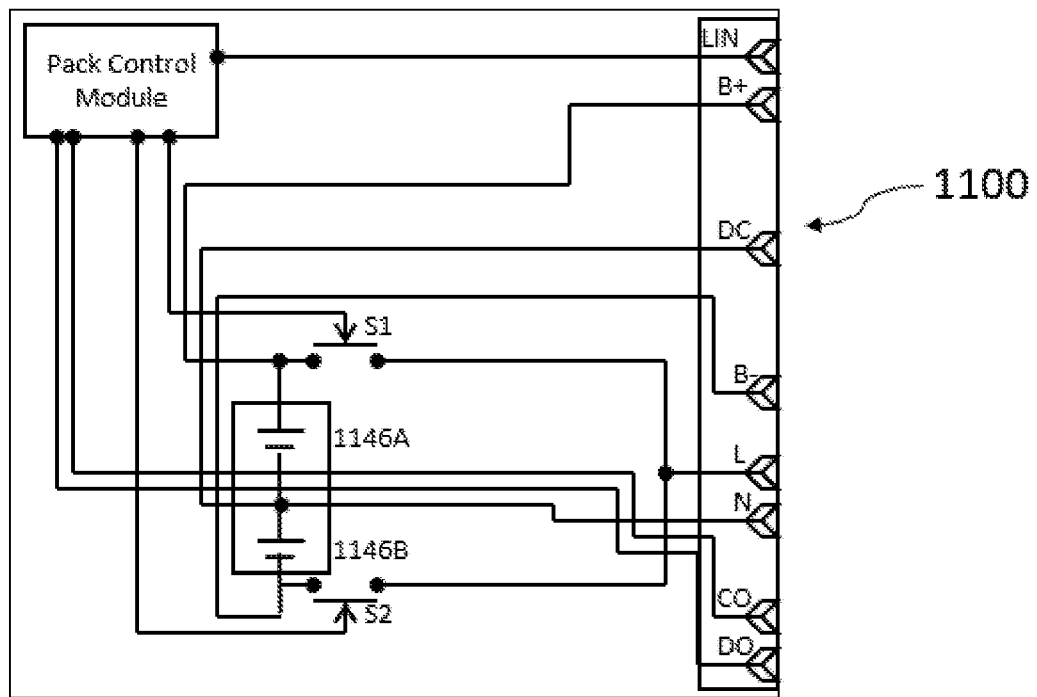
FIG. 30 illustrates an exemplary circuit diagram of the battery pack of FIG. 3 capable of providing an AC output waveform and a DC output waveform from a single battery bank.
Figure 31:
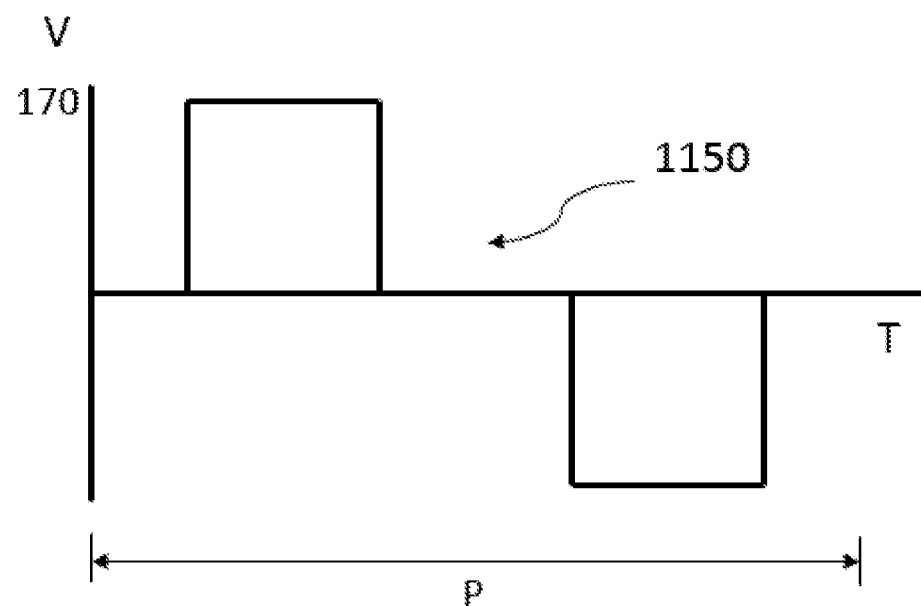
FIG. 31 illustrates an AC waveform output from the battery pack of FIG. 30.
Figure 32:
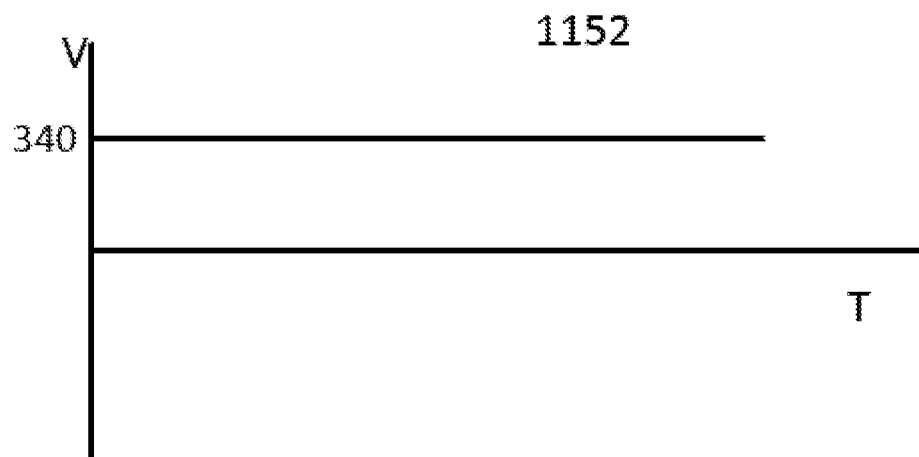
FIG. 32 illustrates a DC waveform output from the battery pack of FIG. 30.
Figure 33:
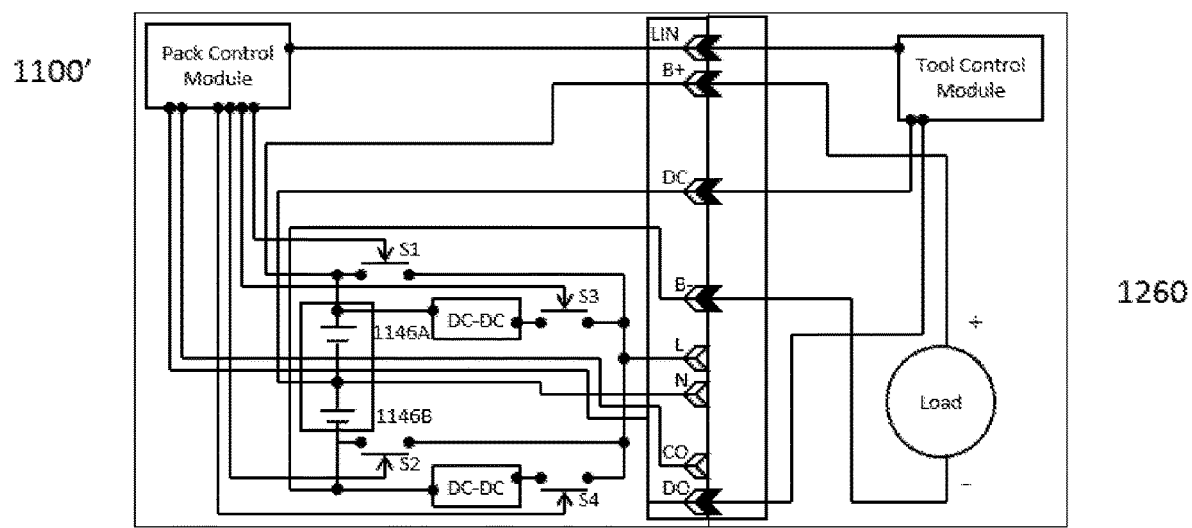
FIG. 33 illustrates another exemplary circuit diagram of the battery pack of FIG. 3 capable of providing an AC output waveform and a DC output waveform from a single battery bank and an exemplary DC power tool circuit diagram that may receive the DC power waveform from the battery pack.
Figure 34:
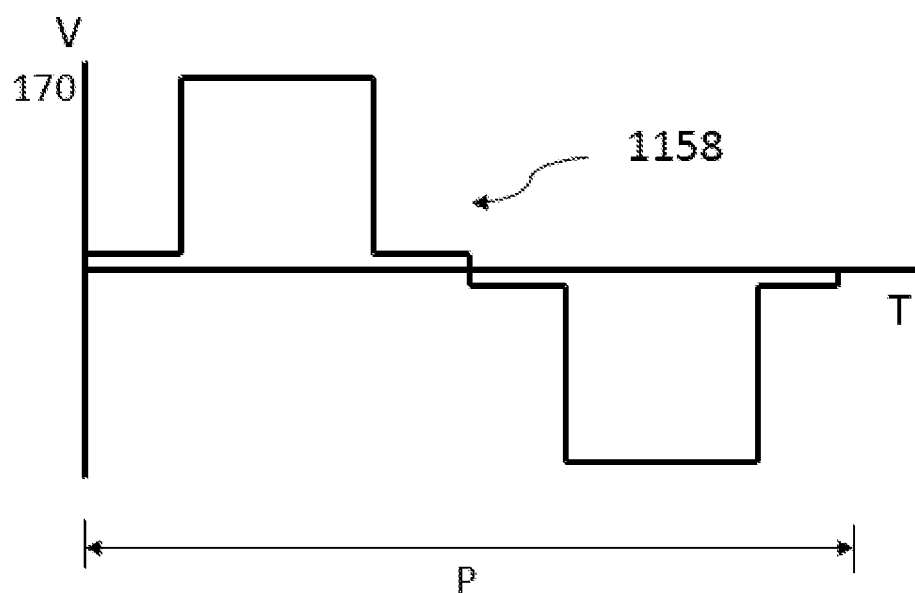
FIG. 34 illustrates an AC waveform output from the battery pack of FIG. 33.
Figure 35:
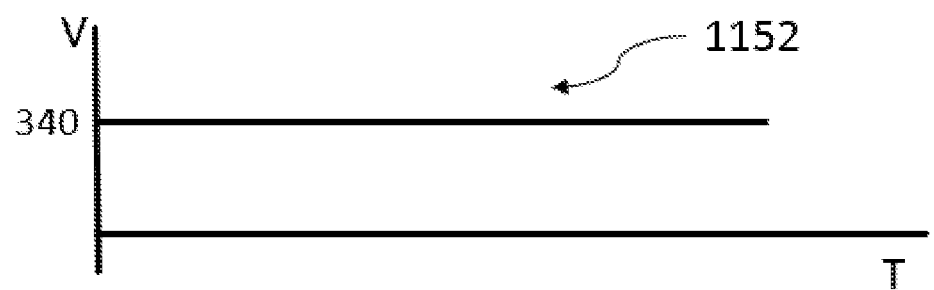
FIG. 35 illustrates a DC waveform output from the battery pack of FIG. 33.
Figure 36:
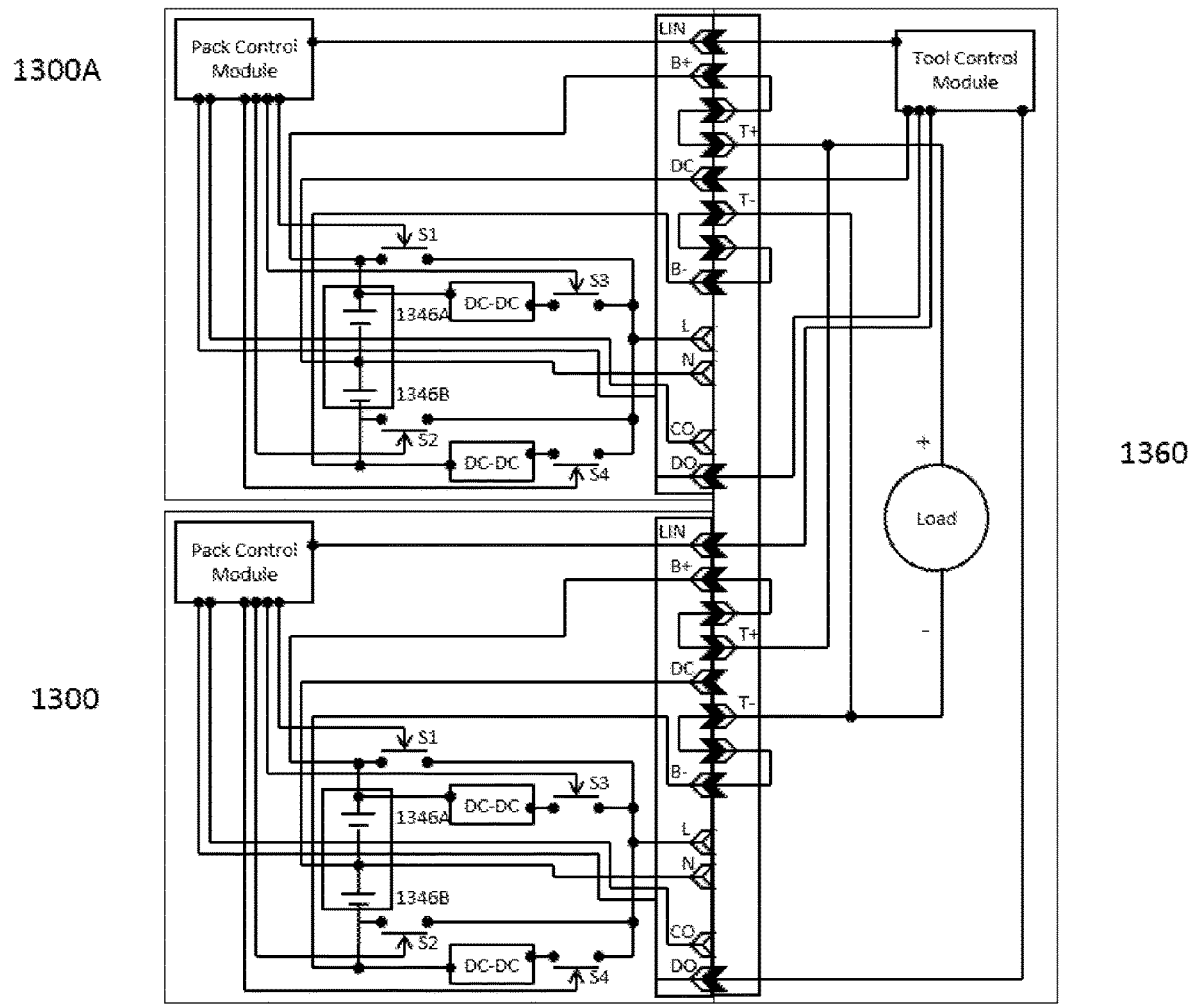
FIG. 36 illustrates an exemplary circuit diagram of a DC power tool of the present invention having two battery pack receptacles and another exemplary circuit diagram of the battery pack of FIG. 3 with two of the battery packs coupled to the power tool.
Figure 37:
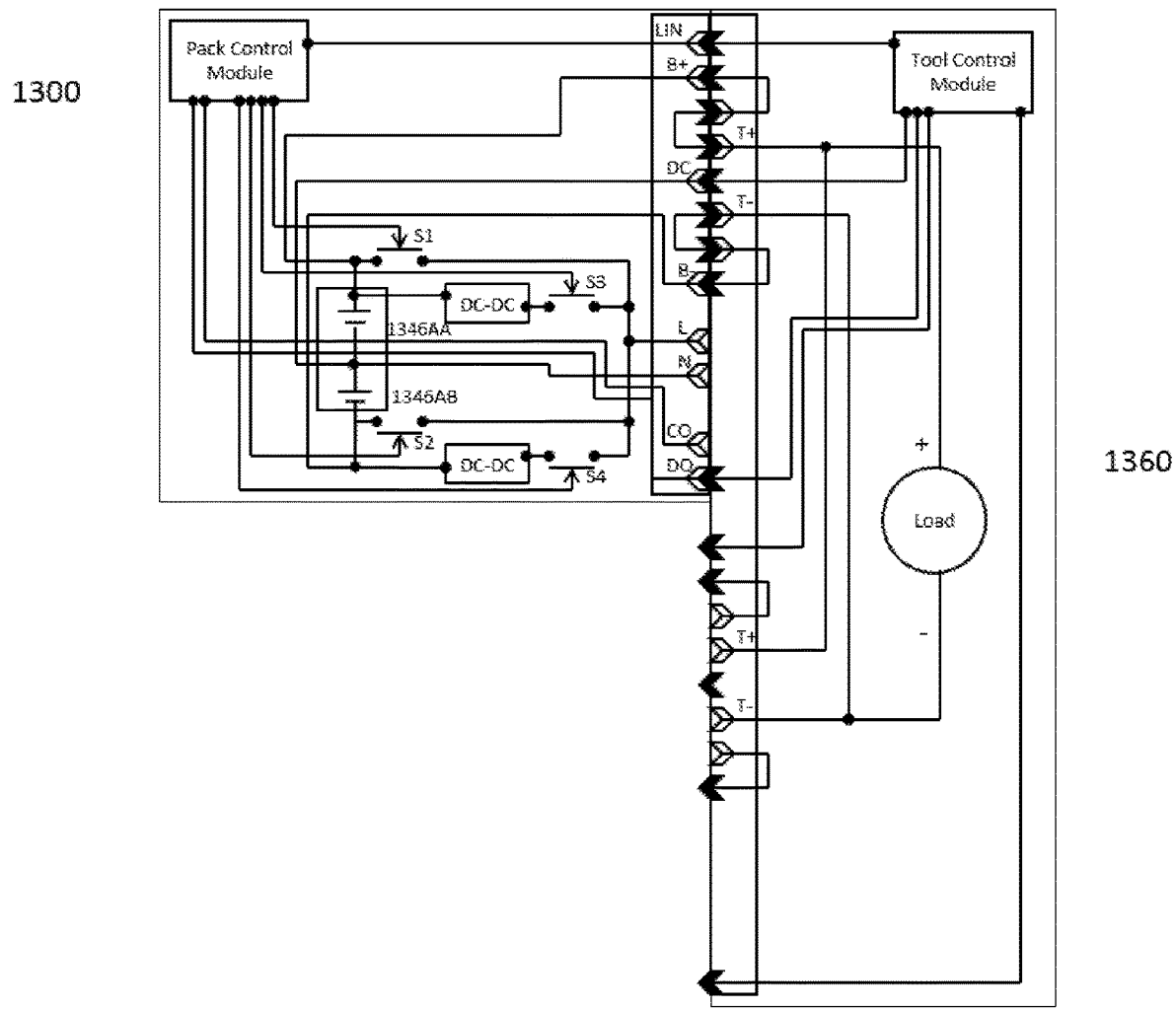
FIG. 37 illustrates one of the battery packs of FIG. 36 coupled to the power tool of FIG. 36 and one of the receptacles empty.
Figure 38:
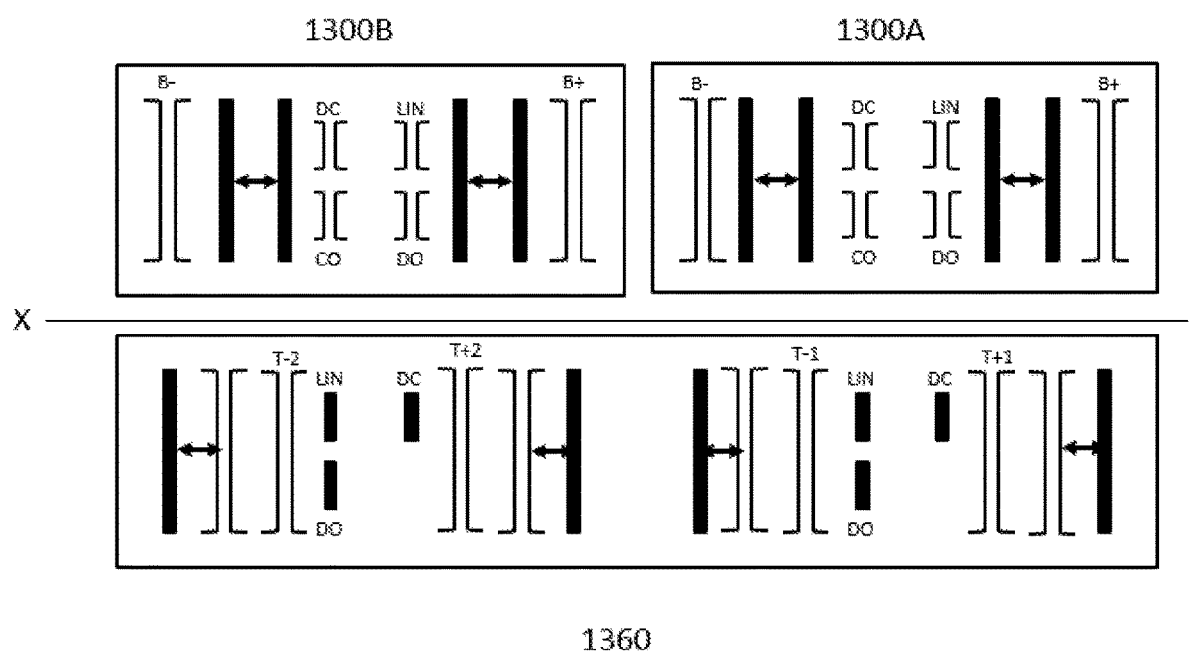
FIG. 38 illustrates an exemplary terminal configuration of the battery packs of FIG. 36 and the power tool of FIG. 36.
Figure 39:
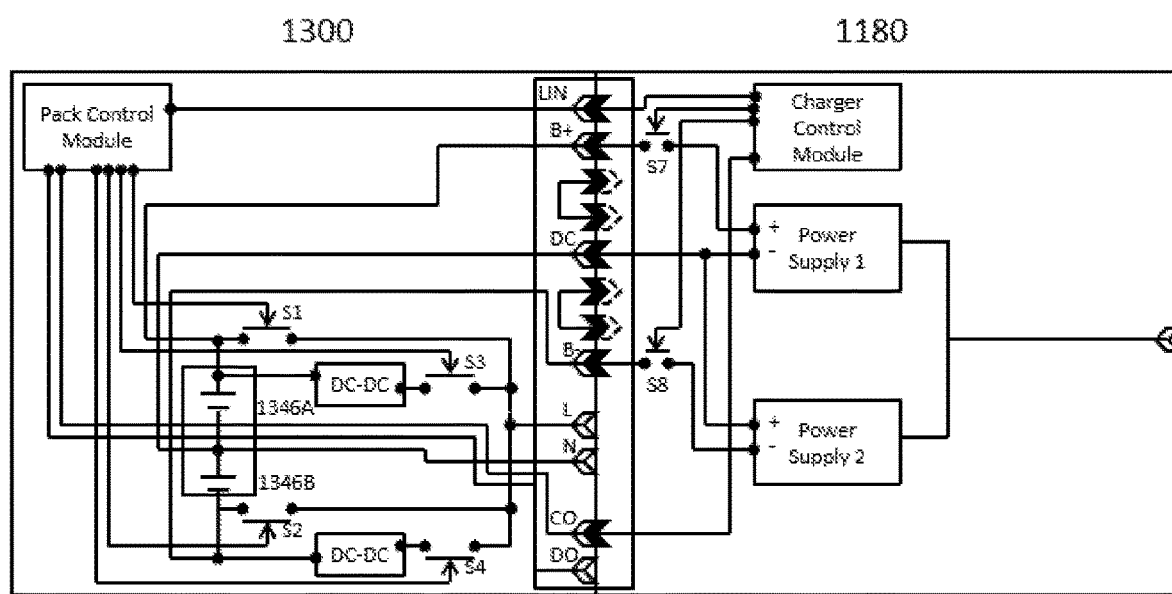
FIG. 39 illustrates the circuit diagram of one of the battery packs of FIG. 36 coupled to an exemplary circuit diagram of an exemplary battery pack charger.
Figure 40:
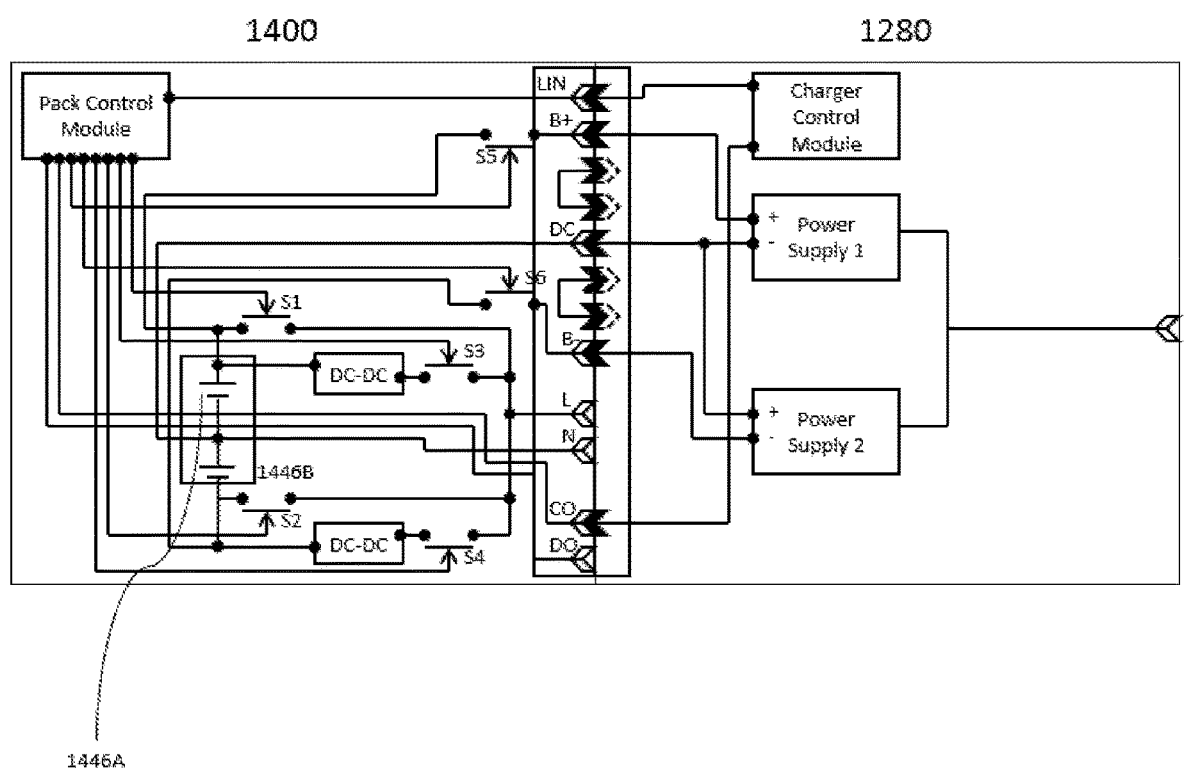
FIG. 40 illustrates another exemplary circuit diagram of a battery pack of FIG. 3 coupled to another exemplary circuit diagram of another exemplary battery pack charger.
Figure 41:
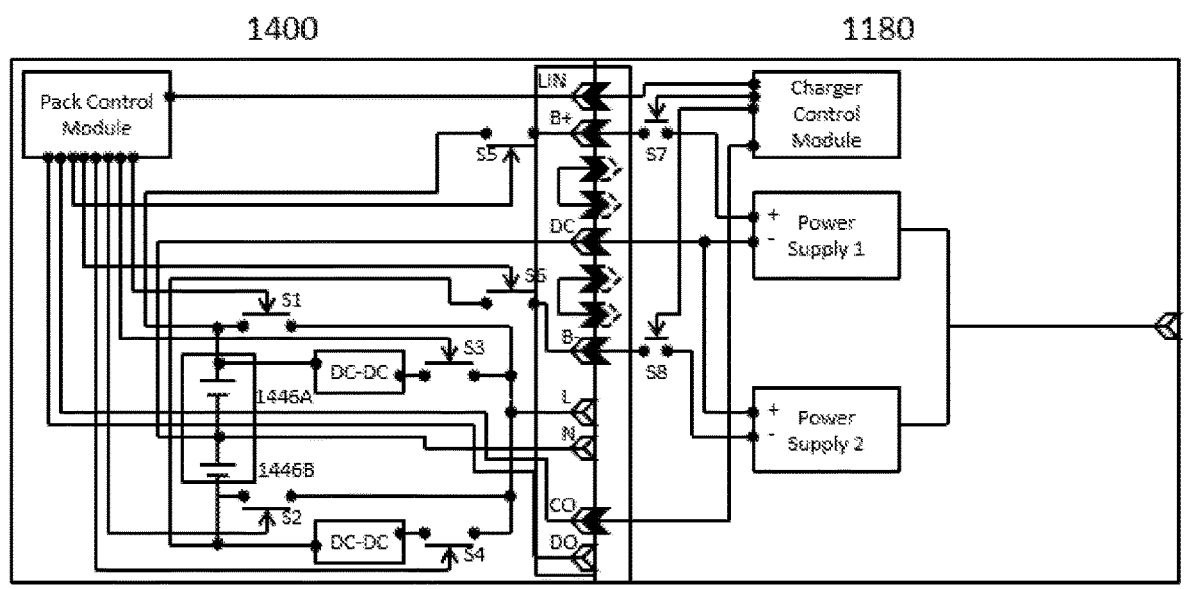
FIG. 41 illustrates the circuit diagram of the battery pack of FIG. 40 coupled to the circuit diagram of the battery pack charger of FIG. 39.
Figure 42:
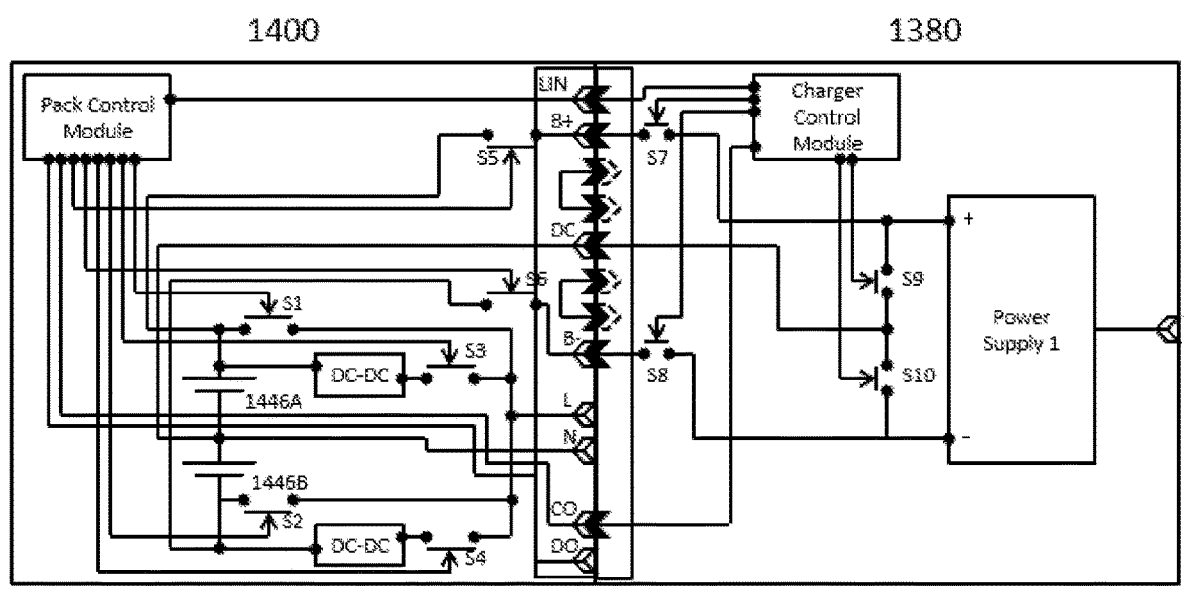
FIG. 42 illustrates the circuit diagram of the battery pack of FIG. 40 coupled to another exemplary circuit diagram of another exemplary battery pack charger.

FIGS. 27 and 28 illustrate another exemplary embodiment of a battery pack 600 in accordance with the present invention and another exemplary embodiment of a DC power tool in accordance with the present invention. The battery pack includes a pack control module. The pack control module may comprise a variety of electrical and electronic components including but not limited to a microprocessor, a microcontroller, an application specific integrated circuit, and memory circuits necessary to carry out command and control functions of the battery pack, as will be described in more detail below. The battery pack also includes a battery pack DC port and a battery pack AC port. The battery pack DC port includes a plurality of battery pack DC terminals (also referred to as a set of battery pack DC terminals) and is capable of providing a DC waveform to a DC power driven (powered) device coupled/mated thereto. The plurality of battery pack DC terminals includes a subset of power terminals. The subset of power terminals includes a first and a second positive power terminal B+ and a first and a second negative power terminal B−. The first positive power terminal B+1 is coupled to a positive terminal of the first subset of battery cells C6A and the second positive power terminal B+2 is coupled to a positive terminal of the second subset of battery cells C6B. The first negative power terminal B−1 is coupled a negative terminal of the first subset of battery cells C6A and the second negative power terminal B−2 is coupled to a negative terminal of the second subset of battery cells C6B. The plurality of battery pack DC terminals also includes a subset of signal (communication) terminals including an identification/communication terminal LIN, a charge control terminal CO and a discharge control terminal DO. The signal terminals transmit/receive information to/from the pack control module. The plurality of battery pack DC terminals may also include a subset of jumper terminals BJT1, BJT2, BJT3. The jumper terminals serve a similar role to the jumper terminals described above.

The battery pack AC port includes a plurality of battery pack terminals and is capable of providing an AC waveform to an AC power driven (powered) device coupled/mated thereto. The AC port may take the form of a conventional three-pronged AC receptacle including a line terminal L and a neutral terminal N.

The battery pack also includes a battery bank C6 comprising a plurality of battery cells (also referred to as a set of battery cells). The battery bank C6 comprises a first sub-bank of battery cells C6A (also referred to as a first subset of battery cells) and a second sub-bank of battery cells C6B (also referred to as a second subset of battery cells). Each subset of battery cells may include at least one battery cell. In a preferred embodiment, each subset of battery cells includes 45 battery cells wherein each battery cell has a nominal voltage of approximately 3.8 volts and a maximum voltage of approximately 4.2 volts. As such, each subset of battery cells has a nominal voltage of approximately 171 volts and a maximum voltage of approximately 189 volts.

The battery pack also includes a converter switch. In the illustrated embodiment, the converter switch is a transistor. However, other types of controllable switches, such as relays may be used. The converter switch includes a first terminal coupled to the pack control module allowing the pack control module to control the converter switch, a second terminal coupled to the negative terminal of the first subset of battery cells C6A and a third terminal coupled to the positive terminal of the second subset of battery cells C6B.

In a first configuration or state, the converter switch is in an open state and the first and second subsets of battery cells C6A, C6B are coupled to the subset of power terminals in a manner to provide two DC waveforms at the DC output port—a first DC waveform at the first positive and first negative power terminals B+1, B−1 equivalent to the voltage of the first subset of battery cells C6A and a second DC waveform at the second positive and second negative power terminals B+2, B−2 equivalent to the voltage of the second subset of battery cells C6B. The two subsets of battery cells are coupled in parallel when the battery pack is coupled to an appropriately configured DC power tool, such as the power tool illustrated in FIGS. 27 and 28, effectively coupling the two DC waveforms presented at the DC output port.

The DC power tool includes a tool positive terminal T+ and a first and a second tool negative terminal T−1, T−2 and a subset of tool jumper terminals TJT1, TJT2, TJT3, TJT4. These terminals are positioned and configured to couple to the set of battery pack terminals to couple the subsets of battery cells in parallel when the converter switch is in an open position. More specifically, as the positive terminal of the first subset of battery cells C6A is electrically coupled to the first positive terminal B+1 and the negative terminal of the first subset of battery cells C6A is coupled to the first negative terminal B−1 and the positive terminal of the second subset of battery cells C6B is coupled to the second positive terminal B+2 and the negative terminal of the second subset of battery cells C6B is coupled to the second negative terminal B−2 when the DC power tool is coupled/mated to the battery pack (the DC power tool input port is coupled/mated to the battery pack DC output port) the first positive power terminal B+1 is coupled/mated to the first tool jumper terminal TJT1 which is electrically coupled to the second tool jumper terminal TJT2 (for example, by a simple wire connection) which is coupled/mated to the first battery jumper terminal BJT1 which is electrically coupled to the second battery pack jumper terminal BJT2 (via a pair of safety switches) which is coupled/mated to the tool positive terminal T+ which is electrically coupled (through the tool control module) to a positive terminal of the load. And, the second positive power terminal B+2 is coupled/mated to the fourth tool jumper terminal TJT4 which is electrically coupled to the third tool jumper terminal TJT3 (for example, by a simple wire connection) which is coupled/mated to the third battery pack jumper terminal BJT3 which is electrically coupled to the second battery pack jumper terminal BJT2 (via the pair of safety switches) which is coupled/mated to the tool positive terminal T+ which, as stated above, is electrically coupled (through the tool control module) to the positive terminal of the load. This effectively couples the positive terminals of the subsets of battery cells C6A, C6B. Furthermore, the first negative power terminal B−1 is coupled/mated to the first tool negative terminal T−1 which is electrically coupled (through the tool control module) to the negative terminal of the load and the second negative power terminal B−2 is coupled/mated to the second tool negative terminal T−2 which is also electrically coupled (through the tool control module) to the negative terminal of the load. This effectively couples the negative terminals of the subsets of battery cells C6A, C6B. As such, the battery pack may provide a DC waveform of approximately 171 volts (nominal) at the DC port across the power terminals B+1, B+2, B−1, B−2 having twice the capacity of one of the subsets of battery cells.

The battery pack also includes an inverter, such as an H bridge inverter, as is well known in the art. The inverter comprises four transistors that are electrically coupled to the battery bank C6 and are controlled by the pack control module to produce an AC waveform at the AC output port. The AC waveform generated by the inverter and provided at the AC output port may be a modified sine wave, as described above. In alternate embodiments, the inverter may generate other AC waveforms, for example, a pure sine wave or a square wave. The battery pack may also include a set of DC-DC converters coupled between the battery bank C6 and the AC output port to provide a constant low positive and negative voltage at the AC output port, as described above with regard to FIGS. 12-14.

For generating the AC waveform at the AC output port the converter switch is closed thereby coupling the subsets of battery cells C6A, C6B in series. This presents a very high voltage battery bank of approximately 340 volts (nominal) for generating a high AC waveform. This is particularly useful in countries where utilities supply a 220V AC waveform on their mains lines. The battery pack may also include an inverter activation switch. The inverter activation switch may include a pair (also referred to as a set) of inverter activation switches. The inverter activation switches may be electrical (transistor) or mechanical (relay) switches. One of the pair of activation switches coupled between one of the inverter transistors and the line terminal L and one of the pair of activation switches coupled between one of the inverter transistors and the neutral terminal N. The inverter activation switch is controlled by the pack control module. As noted above, the battery pack housing may include an inverter on/off switch to be actuated by a user when the battery pack is coupled/mated to an AC powered device. The inverter on/off switch is coupled to the pack control module. When the user actuates the inverter on/off switch to the on position, the pack control module closes the inverter activation switches coupling the inverter to the AC terminals L, N and closes the converter switch and begins operation of the inverter to produce the AC waveform at the AC output port.

As such, this embodiment provides another example of a battery pack that is capable of provide a high voltage DC waveform at a DC output port while simultaneously providing a utility quality AC waveform at an AC output port from a single set of battery cells.

This embodiment also provides an example of a battery pack configures a battery bank in a first configuration (two subsets of battery banks coupled in parallel) to present a DC waveform at a DC output port and in a second configuration (two subsets of battery banks coupled in series) to present an AC waveform at an AC output port.

FIGS. 30-42 present additional alternate exemplary embodiments of a battery pack and alternate exemplary embodiments of a DC power tool and alternate exemplary embodiments of a battery pack charger. The exemplary embodiments illustrated in FIGS. 30-42 present similar embodiments to those illustrated in FIGS. 9-14 and 17-23 and described above. The primary distinction, other than the topology of the circuitry is that the AC output port of the battery packs in FIGS. 30-42 is illustrated on the same side of the battery pack as the DC output port. In this configuration, when the battery pack is coupled/mated to a DC powered device an AC powered device cannot be coupled/mated to the battery pack and when the battery pack is coupled/mated to an AC powered device a DC powered device cannot be coupled/mated to the battery pack.

Numerous modifications may be made to the exemplary implementations described above. These and other implementations are within the scope of this application.

The invention claimed is:

1. A battery pack comprising:
a set of battery cells, the set of battery cells including a first subset and a second subset of battery cells and a pack control module, a set of switches coupled to the set of battery cells, a first switch of the set of switches coupled between a positive node of the first subset of battery cells and an AC output port and a second switch of the set of switches coupled between the AC output port and a negative node of the second subset of battery cells, the first subset and the second subset of battery cells sequentially coupled to the AC output port by the set of switches to provide an AC power signal at the AC output port, the first subset of battery cells solely providing a positive signal portion of the AC power signal at the AC output port and the second subset of battery cells solely providing a negative signal portion of the AC power signal at the AC output port.

2. The battery pack, as recited in claim 1, wherein the set of battery cells provide a DC power signal while simultaneously providing the AC power signal.

3. The battery pack, as recited in claim 1, further comprising a DC-DC converter for each subset of battery cells to produce a zero cross as part of the AC power signal.

4. The battery pack, as recited in claim 3, wherein each DC-DC converter produces a step voltage signal from a battery voltage output by the set of battery cells.

5. The battery pack, as recited in claim 3, wherein the set of battery cells provide a step voltage signal and the DC-DC converters provide a peak voltage.

6. The battery pack, as recited in claim 1, comprising a first set of battery cells to provide a step voltage signal and a second set of battery cells to provide a peak voltage signal.

* * * * *